United States Patent
Wang et al.

(10) Patent No.: US 9,985,741 B2
(45) Date of Patent: May 29, 2018

(54) METHOD FOR ADJUSTING PARAMETERS OF SENDING DEVICE AND RECEIVING DEVICE, AND TERMINAL DEVICE

(71) Applicant: Huawei Technologies Co., Ltd., Shenzhen (CN)

(72) Inventors: Xiang Wang, Shenzhen (CN); Weiyang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 14/855,306

(22) Filed: Sep. 15, 2015

(65) Prior Publication Data

US 2016/0006540 A1    Jan. 7, 2016

Related U.S. Application Data

(63) Continuation of application No. PCT/CN2013/072703, filed on Mar. 15, 2013.

(51) Int. Cl.
*H04M 9/08*    (2006.01)
*H04L 1/00*    (2006.01)
(Continued)

(52) U.S. Cl.
CPC .............. *H04L 1/0009* (2013.01); *H04B 3/32* (2013.01); *H04L 1/0033* (2013.01); *H04M 11/06* (2013.01)

(58) Field of Classification Search
CPC ....... H04L 2025/03414; H04L 25/0204; H04L 25/03159; H04L 25/03343; H04L 5/0007;
(Continued)

(56) References Cited

U.S. PATENT DOCUMENTS 7,512,191 B2 *  3/2009  Laamanen ........ H04L 25/03343
                                                    375/296
8,194,760 B2    6/2012  Papadopoulos
(Continued)

FOREIGN PATENT DOCUMENTS

CN    101790851 A    7/2010
CN    102136852 A    7/2011
(Continued)

OTHER PUBLICATIONS

Lu et al., "A fast Channel Estimation Method for Disorderly Leaving Events in Vectored DSL Systems," 2011 IEEE International Conference on Communications, Kyoto, Japan, pp. 1-6, Institute of Electrical and Electronics Engineers, New York City, New York (Jun. 5-9, 2011).

(Continued)

*Primary Examiner* — Akelaw Teshale
(74) *Attorney, Agent, or Firm* — Leydig, Voit & Mayer, Ltd.

(57) ABSTRACT

The present invention discloses a method for adjusting parameters of a sending device and a receiving device, and a terminal device. In the method, a new precoding parameter that needs to be used by a sending device on a line when a precoding matrix in a downlink direction of the line changes, and a new signal recovery parameter that needs to be used by a receiving device and matches the new precoding parameter are first acquired; and then the new precoding parameter, the new signal recovery parameter, and a set moment and/or symbol at which the sending device starts to use the new precoding parameter are sent to the sending device, and the new signal recovery parameter and the set moment and/or symbol are sent to the receiving device by using the sending device.

20 Claims, 14 Drawing Sheets

(51) Int. Cl.
*H04B 3/32* (2006.01)
*H04M 11/06* (2006.01)

(58) Field of Classification Search
CPC ... H04L 5/0046; H04L 1/0009; H04L 1/0033; H04B 3/32; H04M 11/06
USPC ...................................................... 381/94.3
See application file for complete search history.

(56) References Cited

U.S. PATENT DOCUMENTS

| | | | | |
|---|---|---|---|---|
| 2003/0072380 A1* | 4/2003 | Huang | ............... | H04L 25/0204 375/261 |
| 2009/0054093 A1* | 2/2009 | Kim | ............. | H04B 7/061 455/500 |
| 2009/0059780 A1 | 3/2009 | De Lind Van Wijngaarden et al. | | |
| 2009/0116582 A1* | 5/2009 | Ashikhmin | ............. | H04B 3/32 375/296 |
| 2009/0180566 A1* | 7/2009 | Kimura | ............. | H04L 25/03343 375/265 |
| 2009/0249151 A1* | 10/2009 | Zhou | ............. | H04B 7/061 714/748 |
| 2009/0252247 A1* | 10/2009 | Lee | ............. | H04B 7/0417 375/267 |
| 2010/0278033 A1* | 11/2010 | Ilani | ............. | H04L 5/0046 370/201 |
| 2011/0194551 A1* | 8/2011 | Lee | ............. | H04B 7/0626 370/342 |
| 2011/0216846 A1* | 9/2011 | Lee, II | ............. | H04B 7/0473 375/295 |
| 2012/0087423 A1* | 4/2012 | Ko | ............. | H04B 7/024 375/259 |
| 2013/0083826 A1* | 4/2013 | Zhu | ............. | H04B 7/0473 375/144 |
| 2013/0114415 A1* | 5/2013 | Das | ............. | H04W 16/02 370/238 |
| 2013/0230112 A1* | 9/2013 | Schwager | ............. | H04B 3/542 375/257 |
| 2014/0146657 A1* | 5/2014 | Reves Balleste | ...... | H04B 3/542 370/201 |
| 2014/0146778 A1* | 5/2014 | Wang | ............. | H04B 7/0626 370/329 |
| 2014/0185699 A1* | 7/2014 | Zhang | ............. | H04B 7/024 375/267 |

FOREIGN PATENT DOCUMENTS

| | | |
|---|---|---|
| CN | 102246427 A | 11/2011 |
| CN | 102255642 A | 11/2011 |
| CN | 102318299 A | 1/2012 |
| CN | 102347820 A | 2/2012 |
| EP | 1998464 A1 | 12/2008 |
| WO | WO 2009131376 A2 | 10/2009 |

OTHER PUBLICATIONS

"Series G: Transmission Systems and Media, Digital Systems and Networks; Access networks- Metallic access networks; Fast Access to Subscriber Terminals (FAST)—Physical layer specification," ITU-T G.9701, International Telecommunication Union, pp. 1-338 Geneva, Switzerland (Dec. 2014).

* cited by examiner

METHOD FOR ADJUSTING PARAMETERS OF SENDING DEVICE AND RECEIVING DEVICE, AND TERMINAL DEVICE

CROSS-REFERENCE TO RELATED APPLICATIONS

This application is a continuation of International Patent Application No. PCT/CN2013/072703, filed on Mar. 15, 2013, which is hereby incorporated by reference in its entirety.

TECHNICAL FIELD

The present invention relates to the field of communications technologies, and in particular, to a method for adjusting parameters of a sending device and a receiving device, and a terminal device.

BACKGROUND

A digital subscriber line (DSL) technology is a broadband access technology that implements high-speed data service transmission by using a common phone twisted pair (unshielded twist pair, UTP) as a transmission medium. The digital subscriber line technology mainly enables, by using a frequency division multiplexing technology, a digital subscriber line service and a plain old telephone service (POTS) to coexist in a same common phone twisted pair without a need of replacing an existing basic transmission medium; and in addition, when data transmission is performed by using an existing common phone twisted cable, a high-speed uplink/downlink transmission rate can be achieved. In a whole transmission band, the POTS service occupies a baseband part less than 4 KHz, while the digital subscriber line service occupies a band of a high-frequency part; and signals from the POTS service and the digital subscriber line service are separated by using a separator. The digital subscriber line technology mainly uses a discrete multi-tone (DMT) modulation scheme, so as to improve an anti-interference capability of a digital subscriber line system.

Referring to FIG. 1A and FIG. 1B, a figure in FIG. 1A is a schematic diagram of near-end crosstalk and a figure in FIG. 1B is a schematic diagram of far-end crosstalk. In a digital subscriber line system, a digital subscriber line access multiplexer (DSLAM) 101, as a central office device of the digital subscriber line system, can access multiple DSL lines and optimize a transmission rate. Two DSL lines, namely, a first line 103 established between a central office transceiver 1011 and a subscriber end 1021 and a second line 104 established between a central office transceiver 1012 and a subscriber end 1022, are used as an example. According to an electromagnetic induction principle, crosstalk interference is generated between two signals of the first line 103 and the second line 104 that are accessed by the DSLAM. The crosstalk interference is classified into far-end crosstalk, (FEXT) and near-end crosstalk (NEXT), where FEXT refers to interference between uplink signals of different wire pairs or between downlink signals of different wire pairs, and NEXT refers to interference between an uplink signal and a downlink signal of different wire pairs.

FEXT and NEXT are both enhanced as a frequency band increases; however, because an uplink/a downlink channel of a digital subscriber line system uses a frequency division multiplexing manner, NEXT can be eliminated or reduced by using a filter, which does not affect the digital subscriber line system greatly. However, as a frequency band used by the digital subscriber line system is increasingly larger, FEXT is also enhanced gradually. It can be learn from the Shannon equation $C = B \cdot \log_2(1+S/N)$ (where C is a channel rate, B is a signal bandwidth, S is signal energy, and N is noise energy) that, a greater N indicates a smaller C; and during digital subscriber line transmission, crosstalk interference acts as a noise part, and stronger FEXT indicates a greater N; therefore, severe FEXT may remarkably reduce the channel rate. In this way, when multiple subscribers in a bundle of cables request to enable a digital subscriber line service, due to FEXT, transmission rates of some lines are low, performance is unstable, and even the service cannot be enabled, thereby finally resulting in a low service-enabling rate of a DSLAM.

In view of the foregoing problems, the industry proposes a Vectoring technology currently, in which a DSLAM end uses a downlink precoding technology and an uplink joint reception technology to implement crosstalk cancellation, crosstalk vector information in a line is acquired by means of interaction between the DSLAM end and a terminal, and then an "inverse" crosstalk signal is acquired by performing complex matrix calculation and the "inverse" crosstalk signal is then superimposed on a digital subscriber line signal. During transmission of the digital subscriber line signal, the "inverse" crosstalk signal and FEXT in the line cancel each other out, thereby reducing impact of FEXT on line transmission performance.

In a downlink direction, a precoding technology is used to perform crosstalk cancellation on a to-be-sent signal, so that a signal received by a receive end is not affected by crosstalk interference from another line. However, power and power spectrum density (PSD) at which signals are sent by a transmit end in the downlink direction are strictly limited, and total power for sending the signals cannot exceed a specified maximum value (for example, in 17a template of VDSL2, a power maximum value is 14.5 dBm, that is, $$10^{\frac{14.5}{10}}$$

mW≈28.1838 mW), which requires that precoded downlink signals do not increase total transmit power. To solve a problem of a power limitation, by using linear precoding processing performed on a signal as an example, a precoded signal is generally amplified or diminished in a normalized manner by using a normalization factor λ, so that a sent signal of each line can meet a limitation requirement of the PSD, that is, the total transmit power does not exceed the specified maximum value; and a received signal is recovered by using a recovery factor $$\frac{1}{\lambda}$$

at a receive end, so as to avoid signal distortion. When the normalization factor λ changes, the recovery factor $$\frac{1}{\lambda}$$

at the receive end also correspondingly changes. Ideally, the transmit end and the receive end respectively use the normalization factor λ and the recovery factor $$\frac{1}{\lambda}$$

at the same time, which requires that the normalization factor λ used by the transmit end and the recovery factor $$\frac{1}{\lambda}$$

used by the receive end are necessarily synchronized and coordinated to ensure that distortion, or even a bit error, of a received signal does not occur at the receive end. In addition, when the recovery factor $$\frac{1}{\lambda}$$

at the receive end changes, a signal-to-noise ratio (SNR) of a line also changes, which probably needs to change a related parameter currently used by the receive end; otherwise, distortion of the received signal is probably caused. In this way, it is required that the transmit end and the receive end can synchronously adjust the related parameter to avoid a bit error of the signal received by the receive end. Therefore, due to the foregoing reasons, a mechanism for jointly and synchronously adjusting parameters of a transmit end and a receive end of a line is required.

SUMMARY

The present invention provides a method for adjusting parameters of a sending device and a receiving device, and a terminal device, which can implement synchronous coordination between the parameters of the sending device and the receiving device, thereby reducing a bit error rate of a signal.

According to a first aspect, the present invention provides a method for adjusting parameters of a sending device and a receiving device of a line, where the method includes: acquiring a new precoding parameter that needs to be used by a sending device on a line when a precoding matrix in a downlink direction of the line changes, where the new precoding parameter includes at least a new precoding matrix for performing precoding processing on a signal to be sent by the line; acquiring a new signal recovery parameter that needs to be used by a receiving device on the line and matches the new precoding parameter; and sending, to the sending device, the new precoding parameter, the new signal recovery parameter, and a set moment and/or symbol at which the sending device starts to use the new precoding parameter, and sending, by using the sending device, the new signal recovery parameter and the set moment and/or symbol to the receiving device, so that at the set moment and/or symbol, the sending device starts to use the new precoding parameter and the receiving device starts to use the new signal recovery parameter that matches the new precoding parameter.

With reference to a first possible implementation manner of the first aspect, the step of sending, to the sending device, the new precoding parameter, the new signal recovery parameter, and a set moment and/or symbol at which the sending device starts to use the new precoding parameter includes: sending the new signal recovery parameter to a transmitter in the sending device, so that the transmitter sends the new signal recovery parameter to the receiving device; receiving acknowledgment information that is sent by the transmitter and indicates that the receiving device has correctly received the new signal recovery parameter, where the new signal recovery parameter needs to be used by the receiving device; and sending, to a precoder in the sending device according to the acknowledgment information, the new precoding parameter and a set moment and/or symbol at which the precoder starts to use the new precoding parameter, and sending the set moment and/or symbol to the transmitter, so that the transmitter sends the set moment and/or symbol to the receiving device.

With reference to a second possible implementation manner of the first aspect, after the step of acquiring a new signal recovery parameter that needs to be used by a receiving device on the line and matches the new precoding parameter, the method includes: acquiring, according to the new signal recovery parameter, a new modulation/demodulation parameter that matches the new precoding parameter.

With reference to the second possible implementation manner of the first aspect, in a third possible implementation manner, the step of sending, to the sending device, the new precoding parameter, the new signal recovery parameter, and a set moment and/or symbol at which the sending device starts to use the new precoding parameter includes: further sending, to the sending device, the new modulation/demodulation parameter in addition to the new precoding parameter, the new signal recovery parameter, and the set moment and/or symbol at which the sending device starts to use the new precoding parameter.

With reference to a fourth possible implementation manner of the first aspect, the step of acquiring a new signal recovery parameter that needs to be used by a receiving device on the line and matches the new precoding parameter includes: acquiring a new recovery factor that needs to be used by the receiving device on the line and matches the new precoding parameter, to acquire the new signal recovery parameter.

With reference to the fourth possible implementation manner of the first aspect, in a fifth possible implementation manner, the step of sending, to the sending device, the new precoding parameter, the new signal recovery parameter, and a set moment and/or symbol at which the sending device starts to use the new precoding parameter includes: sending the new recovery factor to a transmitter in the sending device, so that the transmitter acquires, according to the new recovery factor, a new modulation/demodulation parameter that matches the new precoding parameter; or sending the new recovery factor to a transmitter in the sending device, so that the transmitter sends the new recovery factor to the receiving device, and then the receiving device acquires, according to the new recovery factor, a new modulation/demodulation parameter that matches the new precoding parameter.

With reference to a sixth possible implementation manner of the first aspect, the step of acquiring a new precoding parameter that needs to be used by a sending device on a line when a precoding matrix in a downlink direction of the line changes includes: further acquiring, in addition to the new precoding matrix, a new normalization factor that needs to be used by the sending device and is used for power limitation, to obtain the new precoding parameter.

With reference to the sixth possible implementation manner of the first aspect, in a seventh possible implementation manner, the step of sending, to the sending device, the new precoding parameter, the new signal recovery parameter, and a set moment and/or symbol at which the sending device starts to use the new precoding parameter includes: sending the new normalization factor to a transmitter in the sending device, so that the transmitter acquires, according to the new normalization factor, a new modulation/demodulation parameter that matches the new precoding parameter.

With reference to the sixth possible implementation manner of the first aspect, in an eighth possible implementation manner, the step of sending, to the sending device, the new precoding parameter, the new signal recovery parameter, and a set moment and/or symbol at which the sending device starts to use the new precoding parameter includes: sending, to a precoder in the sending device, the new precoding matrix, the new normalization factor, and a set moment and/or symbol at which the precoder starts to use the new precoding matrix and the new normalization factor, and sending the new signal recovery parameter and the set moment and/or symbol to a transmitter in the sending device.

With reference to the sixth possible implementation manner of the first aspect, in a ninth possible implementation manner, the step of sending, to the sending device, the new precoding parameter, the new signal recovery parameter, and a set moment and/or symbol at which the sending device starts to use the new precoding parameter includes: sending, to a precoder in the sending device, the new precoding matrix and a set moment and/or symbol at which the precoder starts to use the new precoding matrix, and sending the new normalization factor, the new signal recovery parameter, and the set moment and/or symbol to a transmitter in the sending device.

According to a second aspect, the present invention provides a terminal device, including: a first acquiring module, configured to acquire a new precoding parameter that needs to be used by a sending device on a line when a precoding matrix in a downlink direction of the line changes, where the new precoding parameter includes at least a new precoding matrix for performing precoding processing on a signal to be sent by the line; a second acquiring module, configured to acquire a new signal recovery parameter that needs to be used by a receiving device on the line and matches the new precoding parameter acquired by the first acquiring module; and a sending module, configured to send, to the sending device, the new precoding parameter, the new signal recovery parameter, and a set moment and/or symbol at which the sending device starts to use the new precoding parameter, and send, by using the sending device, the new signal recovery parameter and the set moment and/or symbol to the receiving device, so that at the set moment and/or symbol, the sending device starts to use the new precoding parameter and the receiving device starts to use the new signal recovery parameter that matches the new precoding parameter.

With reference to a first possible implementation manner of the second aspect, the sending module includes: a first sending unit, configured to send the new signal recovery parameter to a transmitter in the sending device, so that the transmitter sends the new signal recovery parameter to the receiving device; a receiving unit, configured to receive acknowledgment information that is sent by the transmitter and indicates that the receiving device has correctly received the new signal recovery parameter, where the new signal recovery parameter needs to be used by the receiving device; and a second sending unit, configured to send, to a precoder in the sending device according to the acknowledgment information, the new precoding parameter and a set moment and/or symbol at which the precoder starts to use the new precoding parameter, and send the set moment and/or symbol to the transmitter, so that the transmitter sends the set moment and/or symbol to the receiving device.

With reference to a second possible implementation manner of the second aspect, a third acquiring module is configured to acquire, according to the new signal recovery parameter, a new modulation/demodulation parameter that matches the new precoding parameter.

With reference to a third possible implementation manner of the second aspect, the sending module is configured to further send, to the sending device, the new modulation/demodulation parameter in addition to the new precoding parameter, the new signal recovery parameter, and the set moment and/or symbol at which the sending device starts to use the new precoding parameter.

With reference to a fourth possible implementation manner of the second aspect, the second acquiring module is specifically configured to acquire a new recovery factor that needs to be used by the receiving device on the line and matches the new precoding parameter acquired by the first acquiring module, to acquire the new signal recovery parameter.

With reference to the fourth possible implementation manner of the second aspect, in a fifth possible implementation manner, the sending module is configured to send the new recovery factor to a transmitter in the sending device, so that the transmitter acquires, according to the new recovery factor, a new modulation/demodulation parameter that matches the new precoding parameter; or send the new recovery factor to a transmitter in the sending device, so that the transmitter sends the new recovery factor to the receiving device, and then the receiving device acquires, according to the new recovery factor, a new modulation/demodulation parameter that matches the new precoding parameter.

With reference to a sixth possible implementation manner of the second aspect, the first acquiring module is configure to further acquire, in addition to the new precoding matrix, a new normalization factor that needs to be used by the sending device and is used for power limitation, to obtain the new precoding parameter.

With reference to the sixth possible implementation manner of the second aspect, in a seventh possible implementation manner, the sending module is configured to send the new normalization factor to a transmitter in the sending device, so that the transmitter acquires, according to the new normalization factor, a new modulation/demodulation parameter that matches the new precoding parameter.

With reference to the sixth possible implementation manner of the second aspect, in an eighth possible implementation manner, the sending module is specifically configured to send, to a precoder in the sending device, the new precoding matrix, the new normalization factor, and a set moment and/or symbol at which the precoder starts to use the new precoding matrix and the new normalization factor, and send the new signal recovery parameter and the set moment and/or symbol to a transmitter in the sending device.

With reference to the sixth possible implementation manner of the second aspect, in a ninth possible implementation manner, the sending module is further configured to send, to a precoder in the sending device, the new precoding matrix and a set moment and/or symbol at which the precoder starts to use the new precoding matrix, and send the new normalization factor, the new signal recovery parameter, and the set moment and/or symbol to a transmitter in the sending device.

According to a third aspect, the present invention provides a terminal device, including: a processor, a memory, and an output apparatus, where the memory and the output apparatus are both connected to the processor by using a bus; the memory is configured to store data of the terminal device; the processor is configured to acquire a new precoding parameter that needs to be used by a sending device on a line when a precoding matrix in a downlink direction of the line changes, where the new precoding parameter includes at least a new precoding matrix for performing precoding processing on a signal to be sent by the line; the processor is further configured to acquire a new signal recovery parameter that needs to be used by a receiving device on the line and matches the new precoding parameter; the output apparatus is configured to send, to the sending device, the new precoding parameter, the new signal recovery parameter, and a set moment and/or symbol at which the sending device starts to use the new precoding parameter, and send, by using the sending device, the new signal recovery parameter and the set moment and/or symbol to the receiving device, so that at the set moment and/or symbol, the sending device starts to use the new precoding parameter and the receiving device starts to use the new signal recovery parameter that matches the new precoding parameter.

Beneficial effects of the present invention are as follows: In the method for adjusting parameters of a sending device and a receiving device of a line according to the present invention, a new precoding parameter that needs to be used by a sending device on a line when a precoding matrix in a downlink direction of the line changes is first acquired; and then a new signal recovery parameter that needs to be used by a receiving device and matches the new precoding parameter is acquired; and the new precoding parameter, the new signal recovery parameter, and a set moment and/or symbol at which the new precoding parameter starts to be used are sent to the sending device, and the new signal recovery parameter and the set moment and/or symbol are sent to the receiving device by using the sending device, so that at the set moment and/or symbol, the sending device starts to use the new precoding parameter and the receiving device starts to use the new signal recovery parameter that matches the new precoding parameter. In this way, the sending device and the receiving device can change used related parameters at a same moment and/or symbol, thereby implementing synchronous coordination between the parameters of the sending device and the receiving device, and reducing a bit error rate of a signal.

DESCRIPTION OF EMBODIMENTS

In the following descriptions, for the purpose of illustration rather than restriction, specific details about a specified system structure, interface, and technology are proposed, so as to thoroughly understand the present application. However, persons skilled in the art should be aware that the present application may also be implemented in other implementation manners without these specific details. In other cases, detailed illustrations about a well-known apparatus, circuit, and method are omitted, so as to prevent unnecessary details from affecting the descriptions of the present application.

By using a Very-high-bit-rate Digital Subscriber Line 2 (VDSL2) system in a digital subscriber line technology as an example, subscribers in the VDSL2 system share a channel; therefore, when all the subscribers are served at the same time, each subscriber not only receives a signal that is wanted by the subscriber, but also receives a signal from another subscriber. That is, the subscribers interfere with each other. For near-end crosstalk interference, the VDSL2 system uses a frequency division multiplexing (FDM) modulation scheme, and a signal sent by an interfering line is in a different frequency band from a signal received by an interfered-with line, where the interfering line refers to a line that causes crosstalk interference to another line, and the interfered-with line refers to a line that is interfered with by another line; therefore, the near-end crosstalk interference can be eliminated or greatly reduced by using a filter. However, far-end crosstalk interference cannot be eliminated by using a filter. Therefore, for far-end crosstalk interference, far-end crosstalk interference between lines may be effectively eliminated by using a Vectoring (vector precoding) technology.

Figure 1A:
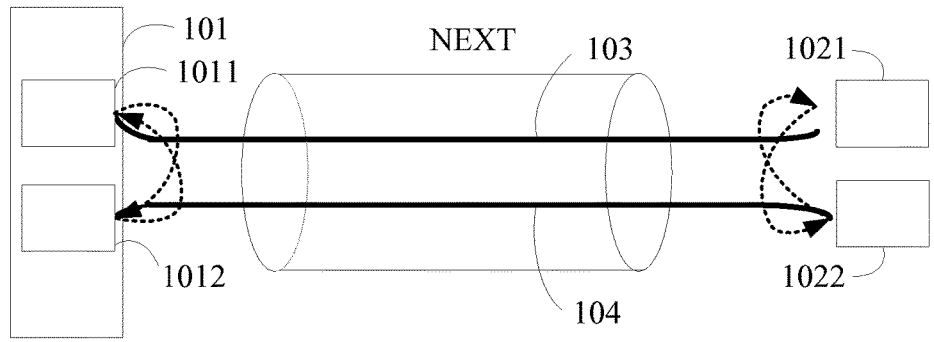
FIG. 1A is a schematic diagram showing that an xDSL system generates crosstalk interference in the prior art.
Figure 1B:
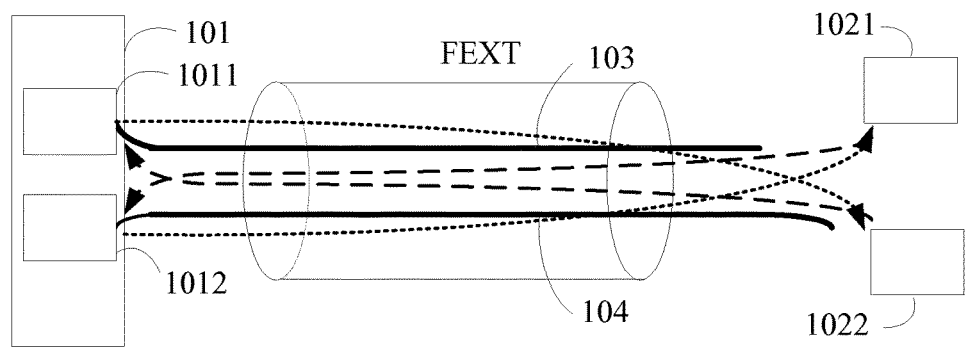
FIG. 1B is a schematic diagram showing that an xDSL system generates crosstalk interference in the prior art.
Figure 2:
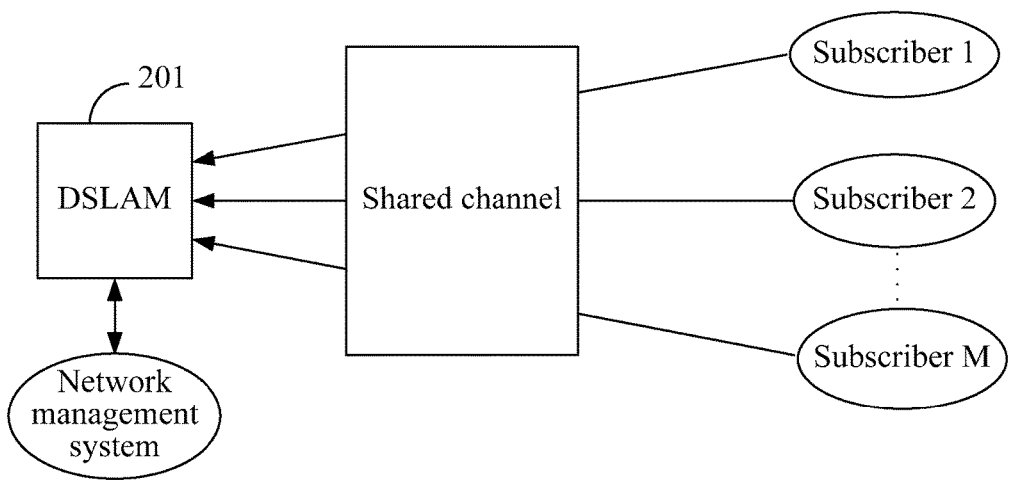
FIG. 2 is a schematic diagram of a principle that a VDSL2 system jointly receives signals at a DSLAM end to cancel out crosstalk interference.
Figure 3:
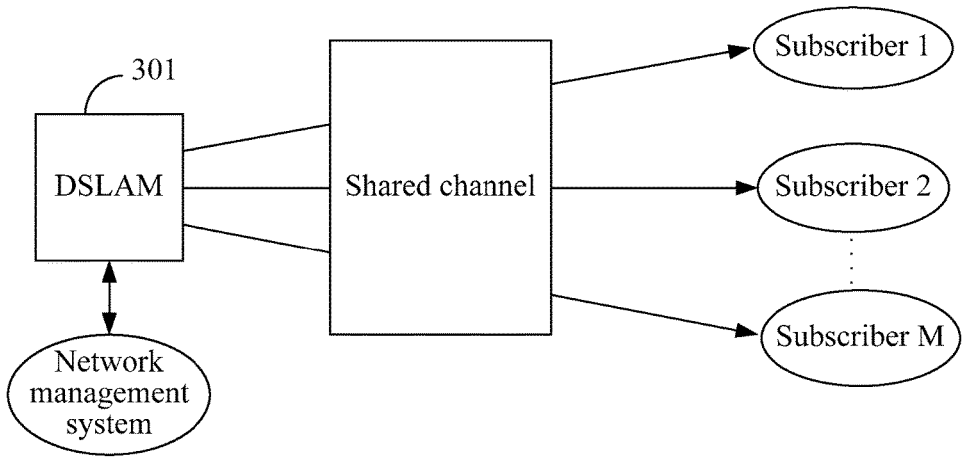
FIG. 3 is a schematic diagram of a principle that a VDSL2 system jointly sends signals at a DSLAM end to cancel out crosstalk interference.

A crosstalk cancellation principle of the Vectoring technology is mainly as follows: Referring to FIG. 2, in an uplink direction, a DSLAM (a central office) 201 jointly receives uplink signals sent by M subscribers, and afterwards, extracts a crosstalk interference signal from the received signals by using an uplink canceller and then removes the crosstalk interference signal from the received signals, so that far-end crosstalk interference can be eliminated. Referring to FIG. 3, in a downlink direction, by means of an agreement between a DSLAM 301 and M subscribers, the subscribers feed back information of crosstalk interference signals to the DSLAM 301; and then, the DSLAM 301 precodes the crosstalk interference signals into to-be-sent signals by using a precoder, that is, before signals are sent, the DSLAM 301 precodes the to-be-sent signals and these crosstalk interference signals by using the precoder; and the to-be-sent signals and the crosstalk interference signals that are precoded cancel each other out during transmission, so that a receive end receives a correct signal approximating a signal without crosstalk, thereby implementing crosstalk cancellation.

Further, in the VDSL2 system, for M subscriber ends, a channel matrix H is a M×M channel transmission matrix, which is expressed as follows:

$$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{M1} & h_{M2} & \cdots & h_{MM} \end{bmatrix}_{M \times M} \quad (1.1)$$

where $h_{ij}$ represents a transmission equation from a line #j to a line #i, which may also be construed as crosstalk interference of the line #j to the line #i, for example, $h_{12}$ represents crosstalk interference of a line #2 to a line #1; and $h_M=[h_{M1}, h_{M2}, \ldots, h_{MM}]$ represents a subscriber channel corresponding to an $M^{th}$ subscriber end.

It is assumed that x is a M×1 channel input vector (that is, a sent signal), y is a M×1 channel output vector (that is, a received signal), and n is a M×1 noise vector; and then, a channel transmission equation may be expressed as follows:

$$y = F(Hx+n) \quad (1.2)$$

where $$F = \begin{bmatrix} f_1 & 0 & \cdots & 0 \\ 0 & f_2 & \cdots & 0 \\ \vdots & \vdots & \ddots & \vdots \\ 0 & 0 & \cdots & f_M \end{bmatrix}_{M \times M}$$

is a diagonal matrix, and a diagonal element $f_i$ in the matrix is a frequency equalization (FEQ) coefficient, which indicates a process in which a receive end of the line #i recovers a received signal to an originally sent signal.

In the downlink direction, a vector precoder P is introduced at a transmit end to perform joint sending processing on to-be-sent signals, and precoding processing is performed on all the signals by the vector precoder P before they are sent out. The precoding processing process may be a linear precoding process, and in this case, a signal sent by the transmit end is:

$$\tilde{x} = Px \quad (1.3)$$

Correspondingly, a signal received by a receive end is:

$$\tilde{y} = F(H\tilde{x}+n) = F(HPx+n) \quad (1.4)$$

When FHP is a diagonal matrix, crosstalk between lines is canceled out, and the receive end receives only a signal that is sent by a line of the receive end.

In addition, to meet a limitation requirement of PSD, normalization processing is performed, by using a normalization factor λ, on the signal $\tilde{x}$ on which precoding processing has been performed, and then a signal sent by the transmit end is:

$$t = \tilde{\lambda}x = \lambda Px \quad (1.5)$$

Correspondingly, the received signal is recovered at the receive end by using a recovery factor $$\frac{1}{\lambda},$$

and then a signal received by the receive end is:

$$\tilde{y}'' = \frac{1}{\lambda}\tilde{y} = \frac{1}{\lambda}F(Ht+n) = \frac{1}{\lambda}F(H\lambda Px+n) \quad (1.6)$$

Therefore, in the foregoing manner, crosstalk between lines can be canceled out and a PSD requirement can also be met.

In addition, crosstalk cancellation may also be implemented and a PSD requirement may also be met in a non-linear precoding manner, for example, by using a Tomlinson-Harashima precoding (THP) non-linear precoding technology. In a general manner, QR decomposition is performed on a transpose of a channel or a conjugate transpose of a channel, that is, a QR-THP technology is used. By using that QR decomposition is performed on a transpose of a channel as an example, the following equation is obtained:

$$H^T = QR \quad (1.7)$$

where Q is a unitary matrix, and R is an upper triangular matrix. A signal on which non-linear precoding processing has been performed may be expressed as follows: p=(x,Q,R); the receive end recovers a received signal by using a diagonal element of the upper triangular matrix, and such a recovery process is a non-linear process. An FEQ coefficient of a line #k is represented by $f_k(y_k, r_{kk})$, where $y_k$ is a signal received by a receive end of the line #k, $r_{kk}$ is a $k^{th}$ diagonal element of the upper triangular matrix R, and $r_{kk}$ constitutes a recovery factor used by the receive end of the line #k to recover a signal. Therefore, the signal received by the receive end is:

$$y_k = f_k([H \cdot p(x,Q,R)+n]_k, r_{kk}) \quad (1.8)$$

During crosstalk cancellation by means of linear precoding, a used normalization factor $\lambda$ is calculated based on a PSD requirement and according to a precoding matrix currently used by a precoder, and a recovery factor $1/\lambda$ used by a receiving device is associated with the normalization factor $\lambda$; and during the crosstalk cancellation by means of non-linear precoding, a recovery factor $r_{kk}$ used by the receiving device is directly associated with the precoding matrix currently used by the precoder. Therefore, no matter whether linear precoding processing or non-linear precoding processing is performed on a signal, the recovery factor used by the receiving device is associated with the precoding matrix, that is, the recovery factor is determined by the precoding matrix used by the precoder. A change of the precoding matrix probably causes a change of the recovery factor of the receiving device, and the change of the recovery factor probably causes changes of other parameters, such as a bit table and a power gain table, of a sending device and a receiving device. Therefore, in a case in which a recovery factor changes, it is required that a sending device and a receiving device of a line use corresponding parameters at a same moment, so as to reduce a bit error rate; and in a case in which there is a change of a current precoding matrix and the change causes a change of the recovery factor, it is required to synchronously coordinate the parameters used by the sending device and the receiving device. In view of this, the present invention provides a method for synchronously adjusting related parameters of a sending device and a receiving device of a line.

Figure 4:
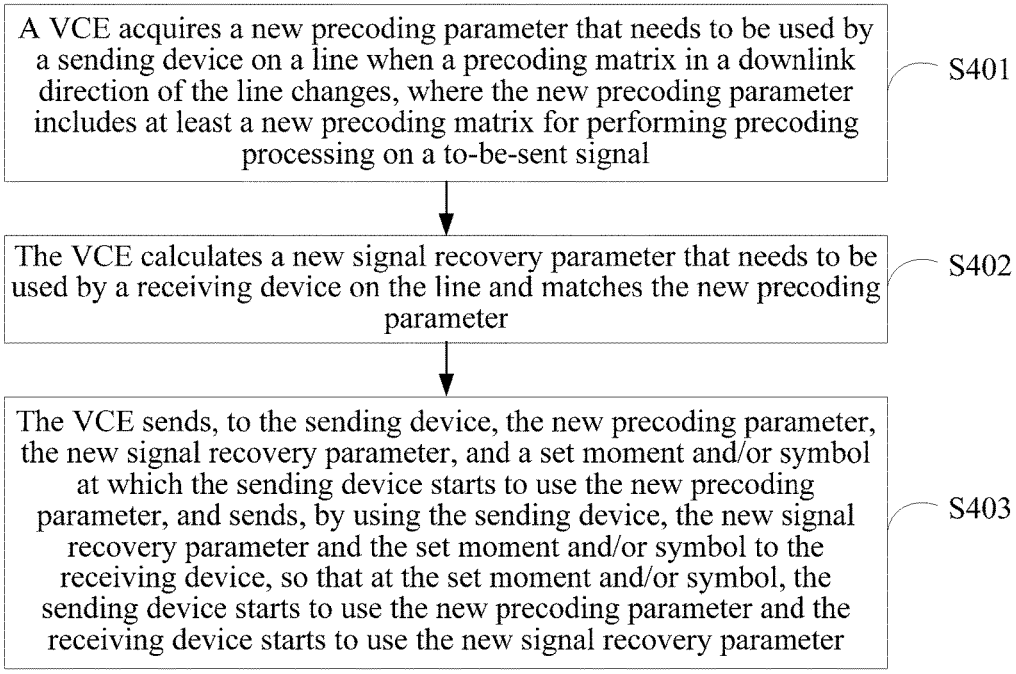
FIG. 4 is a flowchart of an implementation manner of a method for adjusting parameters of a sending device and a receiving device of a line according to the present invention.

Referring to FIG. 4, FIG. 4 is a flowchart of an implementation manner of a method for adjusting parameters of a sending device and a receiving device of a line according to the present invention, where the method includes the following steps:

Step S401: A VCE acquires a new precoding parameter that needs to be used by a sending device on a line when a precoding matrix in a downlink direction of the line changes, where the new precoding parameter includes at least a new precoding matrix for performing precoding processing on a to-be-sent signal.

Figure 5:
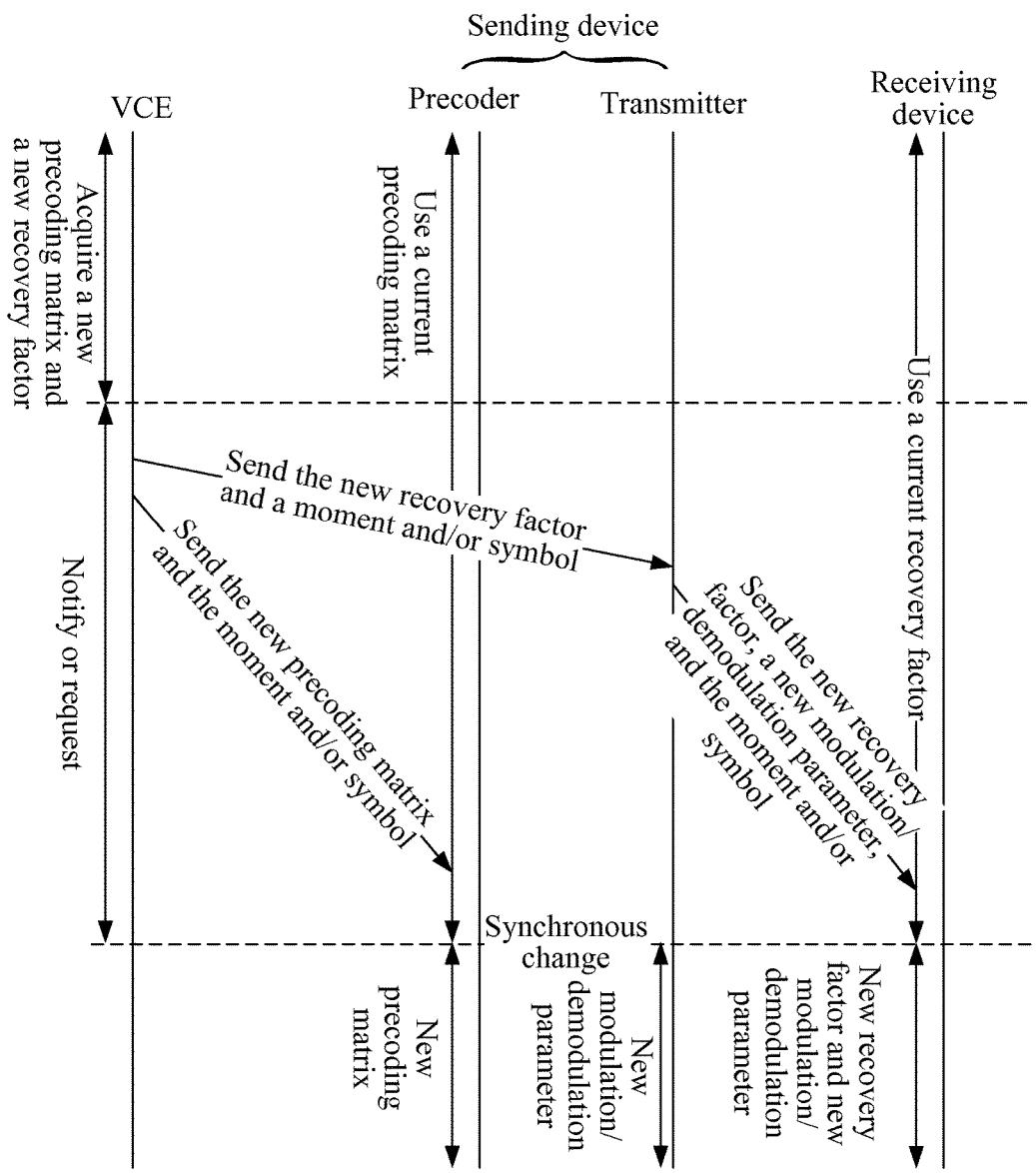
FIG. 5 is an interaction diagram of an implementation manner of a method for adjusting parameters of a sending device and a receiving device of a line according to the present invention.

Further referring to FIG. 5, in this implementation manner, parameters of a sending device of a central office and a receiving device of a subscriber end are jointly coordinated by means of unified control of the VCE (Vectoring Control Entity, vectoring control entity). The sending device includes a precoder for performing precoding processing on a signal and a transmitter for sending the signal on which the precoding processing has been performed, and parameters of the precoder, the transmitter, and the receiving device are jointly adjusted by means of the unified control of the VCE.

In a downlink direction, to cancel out crosstalk interference from lines, before sending a signal to the receiving device of the subscriber end, the sending device first performs precoding processing on the signal by using the precoder, so as to perform crosstalk cancellation; and then sends the processed signal to the receiving device of the subscriber end by using the transmitter.

It is assumed that there are n pairs of lines in this case, where lines #1, #2, . . . , and #m are in a Showtime (the lines are performing transmission) state, while lines #m+1, #m+2, . . . , and #n are in a non-activated state. Precoding processing is performed on signals between all the Showtime-state lines to cancel out crosstalk between the lines, and a channel matrix H is as follows:

$$H = \begin{bmatrix} h_{1,1} & \cdots & h_{1,m} & h_{1,m+1} & \cdots & h_{1,n} \\ \vdots & \ddots & \vdots & \vdots & \ddots & \vdots \\ h_{m,1} & \cdots & h_{m,m} & h_{m,m+1} & \cdots & h_{m,n} \\ h_{m+1,1} & \cdots & h_{m+1,m} & h_{m+1,m+1} & \cdots & h_{m+1,n} \\ \vdots & \ddots & \vdots & \vdots & \ddots & \vdots \\ h_{n,1} & \cdots & h_{n,m} & h_{n,m+1} & \cdots & h_{n,n} \end{bmatrix}_{n \times n}$$

where a sub-matrix on the top left corner represents a crosstalk channel matrix between m pairs of Showtime-state lines, that is:

$$\tilde{H} = \begin{bmatrix} h_{1,1} & \cdots & h_{1,m} \\ \vdots & \ddots & \vdots \\ h_{m,1} & \cdots & h_{m,m} \end{bmatrix}_{m \times m}$$

In this implementation manner, precoding processing that is performed by a sending device of the Showtime-state line is non-linear precoding (for example, THP non-linear precoding), and a precoding parameter is a parameter that needs to be used by the sending device when the sending device performs precoding processing on a to-be-sent signal, and includes a precoding matrix that needs to be used by a precoder in the sending device. A process in which the precoder currently performs non-linear precoding processing on the signal by using the precoding matrix is expressed as follows: $p(\tilde{x}, \tilde{Q}, \tilde{R})$. By means of non-linear precoding processing on the to-be-sent signal, a PSD requirement can be met and crosstalk between lines can also be canceled out. During crosstalk cancellation performed by the precoder in a non-linear precoding manner, recovery factors used by receiving devices of different lines may be the same or may be different. By using a line #k as an example, a receiving device of the line #k needs to use a recovery factor $\tilde{r}_{kk}$ to recover a received signal, and this recovery process is also a non-linear process; therefore, a signal currently received by the receiving device is expressed as follows:

$$\tilde{y}_k = f_k([\tilde{H} \cdot p(\tilde{x}, \tilde{Q}, \tilde{R}) + \tilde{n}]_k, \tilde{r}_{kk})$$

When a new line is activated, for example, when the lines #m+1, #m+2, . . . , and #n are activated synchronously or at least one of them is activated, or when an existing line exits, a channel matrix changes from $\tilde{H}$ to H, which has crosstalk impact on the Showtime-state line; therefore, it is required to change a precoding matrix that is currently used by the precoder in the sending device of the Showtime-state line. In this case, the VCE first acquires a new precoding matrix that needs to be used by the precoder in the sending device, where the new precoding matrix is relative to the precoding matrix currently used by the sending device. That is, when a new line is activated or an existing line exits, the precoder of the Showtime-state line is to use the new precoding matrix to perform precoding processing on the to-be-sent signal instead of the current precoding matrix, so as to ensure correct crosstalk cancellation.

Step S402: The VCE calculates a new signal recovery parameter that needs to be used by a receiving device on the line and matches the new precoding parameter.

A signal recovery parameter used by the receiving device refers to a parameter that needs to be used by the receiving device to recover a received signal to an original signal on which the sending device has not performed precoding processing. In this implementation manner, the new signal recovery parameter refers to a new recovery factor that needs to be used by the receiving device and matches the new precoding parameter; and the receiving device uses the new recovery factor to recover a received signal on which power limitation processing is performed. In this implementation manner, the precoder uses a new precoding matrix to perform precoding processing on the to-be-sent signal, and the receiving device should also use a new recovery factor $r_{kk}$ that matches the new precoding matrix, to recover the received signal, so as to reduce a bit error rate of the received signal. After calculating the new precoding matrix that needs to be used by the precoder, the VCE calculates, according to the new precoding matrix, the new recovery factor $r_{kk}$ that needs to be used by the receiving device.

Step S403: The VCE sends, to the sending device, the new precoding parameter, the new signal recovery parameter, and a set moment and/or symbol at which the sending device starts to use the new precoding parameter, and sends, by using the sending device, the new signal recovery parameter and the set moment and/or symbol to the receiving device, so that at the set moment and/or symbol, the sending device starts to use the new precoding parameter and the receiving device starts to use the new signal recovery parameter.

When the precoder performs precoding on a signal by using the new precoding matrix, the receiving device should also use the new recovery factor $r_{kk}$ at a same moment to recover a received signal. In this case, it is required to synchronously adjust related parameters used by the sending device and the receiving device.

Specifically, the VCE sends the new precoding parameter (for example, the precoding matrix) to the precoder in the sending device, and in addition, the VCE sets a moment and/or symbol; and then sends the moment and/or symbol to the precoder, which indicates that the precoder starts to use the new precoding matrix at the set moment and/or symbol, and a non-linear precoding processing process performed by the precoder on the signal changes from current $p(\tilde{x},\tilde{Q},\tilde{R})$ to $p(x,Q,R)$. In addition, the VCE sends the new recovery factor $r_{kk}$ and the set moment and/or symbol to a transmitter in the sending device, so that the transmitter calculates, according to the new recovery factor $r_{kk}$, a new modulation/demodulation parameter of a line corresponding to the transmitter, where the modulation/demodulation parameter includes one or a combination of multiple of the following parameters:

(1) a bit table (bit table);
(2) a power gain table (gi table);
(3) a frequency domain equalization table (FEQ table, Frequency Domain Equalization table); and
(4) a physical media specific (PMS, Physical Media Specific)-layer framing parameter.

In addition, after the transmitter calculates the new modulation/demodulation parameter, the transmitter sends the new recovery factor $r_{kk}$, the new modulation/demodulation parameter, and the set moment and/or symbol to the receiving device, so that at the set moment and/or symbol, the precoder in the sending device starts to use the new precoding parameter and the receiving device starts to use the new recovery factor $r_{kk}$; and a signal received by the receiving device changes from current $$\tilde{y}_k = f_k([\tilde{H} \cdot p(\tilde{x},\tilde{Q},\tilde{R})+\tilde{n}]_k, \tilde{r}_{kk})$$

to $$y_k = f_k([H \cdot p(x,Q,R)+n]_k, r_{kk})$$

At the same time, the transmitter and the receiving device uses the new modulation/demodulation parameter that matches the new precoding parameter and/or the new recovery factor $r_{kk}$.

By means of unified control of a VCE, synchronous coordination is implemented between related parameters of a precoder, a transmitter, and a receiving device of a line, which avoids a bit error that is probably caused when the receiving device still uses a current recovery factor $\tilde{r}_{kk}$ while the precoder uses a new precoding matrix, so that a bit error rate of a signal that is caused by the receiving device can be reduced.

Figure 6:
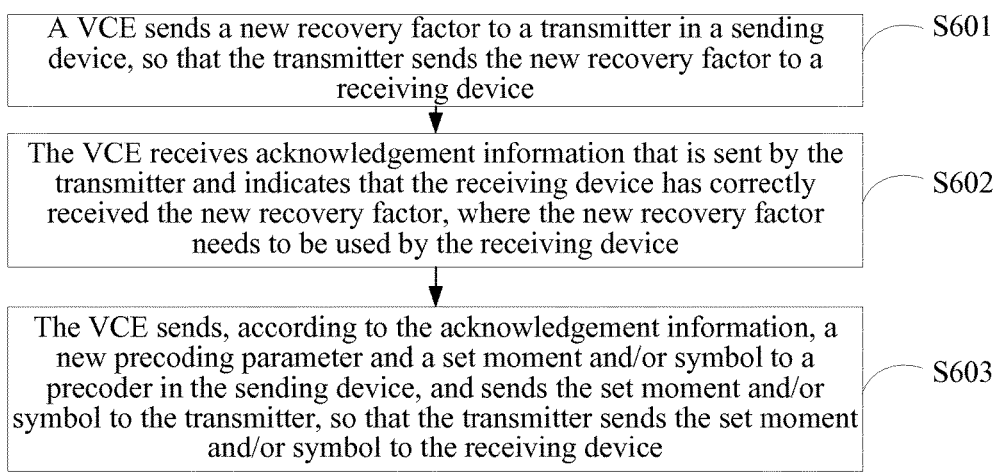
FIG. 6 is a flowchart of sending, to a sending device, a new precoding parameter, a new recovery factor, and a set moment and/or symbol at which the sending device starts to use the new precoding parameter in another implementation manner of a method for adjusting parameters of the sending device and a receiving device of a line according to the present invention.
Figure 7:
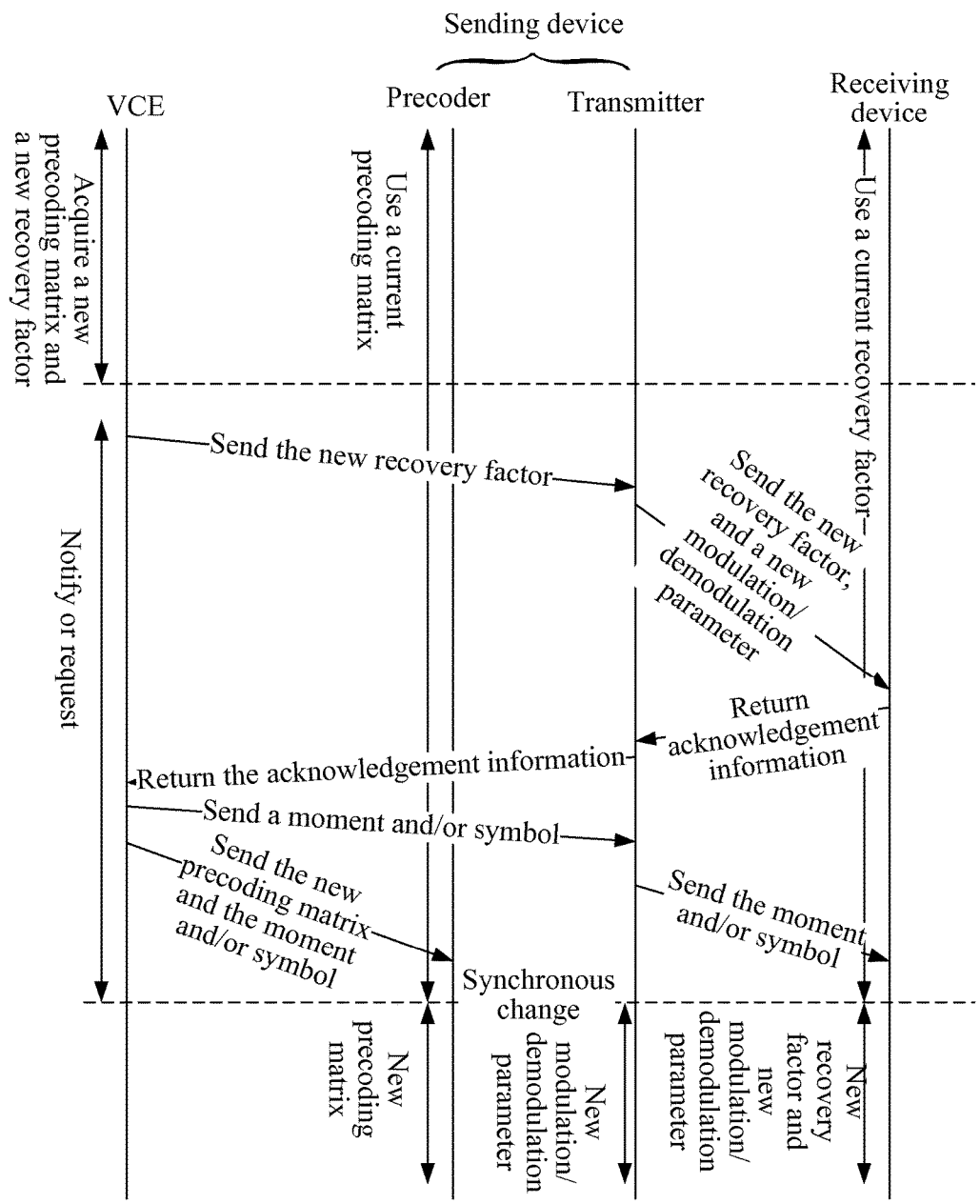
FIG. 7 is an interaction diagram of another implementation manner of a method for adjusting parameters of a sending device and a receiving device of a line according to the present invention.

It should be noted that, there may be multiple manners for sending related data (that is, the new modulation/demodulation parameter that needs to be used by the transmitter and the receiving device, the new recovery factor that needs to be used by the receiving device, and the moment and/or symbol at which the precoder needs to use the new precoding matrix) to the receiving device. In the foregoing implementation manner, the VCE sends, to the transmitter, the new recovery factor $r_{kk}$ and the set moment and/or symbol at which the precoder starts to use the new precoding matrix; the transmitter receives the new recovery factor $r_{kk}$ and then calculates the new modulation/demodulation parameter according to the new recovery factor $r_{kk}$, and the transmitter directly sends, to the receiving device without a need of a feedback, the new modulation/demodulation parameter and the new recovery factor $r_{kk}$ that need to be used by the receiving device, and the set moment and/or symbol at which the precoder starts to use the new precoding matrix. In another implementation manner, referring to FIG. 6 and with reference to FIG. 7, a VCE and a transmitter jointly send, to a receiving device in a feedback manner, a new modulation/demodulation parameter, a new recovery factor $r_{kk}$, and a set moment and/or symbol that need to be used by the receiving device. In this case, the step that the VCE sends, to the sending device, the new precoding parameter, the new signal recovery parameter, and the set moment and/or symbol at which the sending device starts to use the new precoding parameter includes:

Step S601: The VCE sends a new recovery factor $r_{kk}$ to a transmitter in the sending device, so that the transmitter sends the new recovery factor $r_{kk}$ to the receiving device.

In this implementation manner, after receiving the new recovery factor $r_{kk}$, the transmitter further calculates, according to the new recovery factor $r_{kk}$, a new modulation/demodulation parameter of a line corresponding to the transmitter, where the new modulation/demodulation parameter matches the new precoding parameter and/or the new recovery parameter $r_{kk}$. In this case, the transmitter further sends, in addition to the new recovery factor $r_{kk}$, the new modulation/demodulation parameter to the receiving device.

Step S602: The VCE receives acknowledgment information that is sent by the transmitter and indicates that the receiving device has correctly received the new recovery factor, where the new recovery factor needs to be used by the receiving device.

After receiving the new modulation/demodulation parameter and the new recovery factor $r_{kk}$, the receiving device sends acknowledgment information to the transmitter, so as to acknowledge, to the transmitter, that the receiving device has correctly received the new recovery factor $r_{kk}$ that needs to be used. After receiving the acknowledgment information sent by the receiving device, the transmitter sends acknowledgment information to the VCE, so as to acknowledge, to the VCE, that the receiving device corresponding to the transmitter has correctly received the new recovery factor $r_{kk}$ that needs to be used. The VCE receives the acknowledgment information that is sent by the transmitter and indicates that the receiving device corresponding to the transmitter has received the new recovery factor $r_{kk}$.

Step S603: The VCE sends, according to the acknowledgment information, the new precoding parameter and the set moment and/or symbol to a precoder in the sending device, and sends the set moment and/or symbol to the transmitter, so that the transmitter sends the set moment and/or symbol to the receiving device.

After receiving the set moment and/or symbol, the transmitter sends the set moment and/or symbol to the receiving device. The set moment and/or symbol is a moment and/or symbol at which the sending device starts to use the new precoding parameter, so as to instruct the receiving device to use the new recovery factor $r_{kk}$ at the moment and/or symbol. Simultaneously, at the moment and/or symbol, the transmitter and the receiving device start to use the new modulation/demodulation parameter that matches the new precoding parameter and/or the new recovery factor $r_{kk}$.

Figure 8:
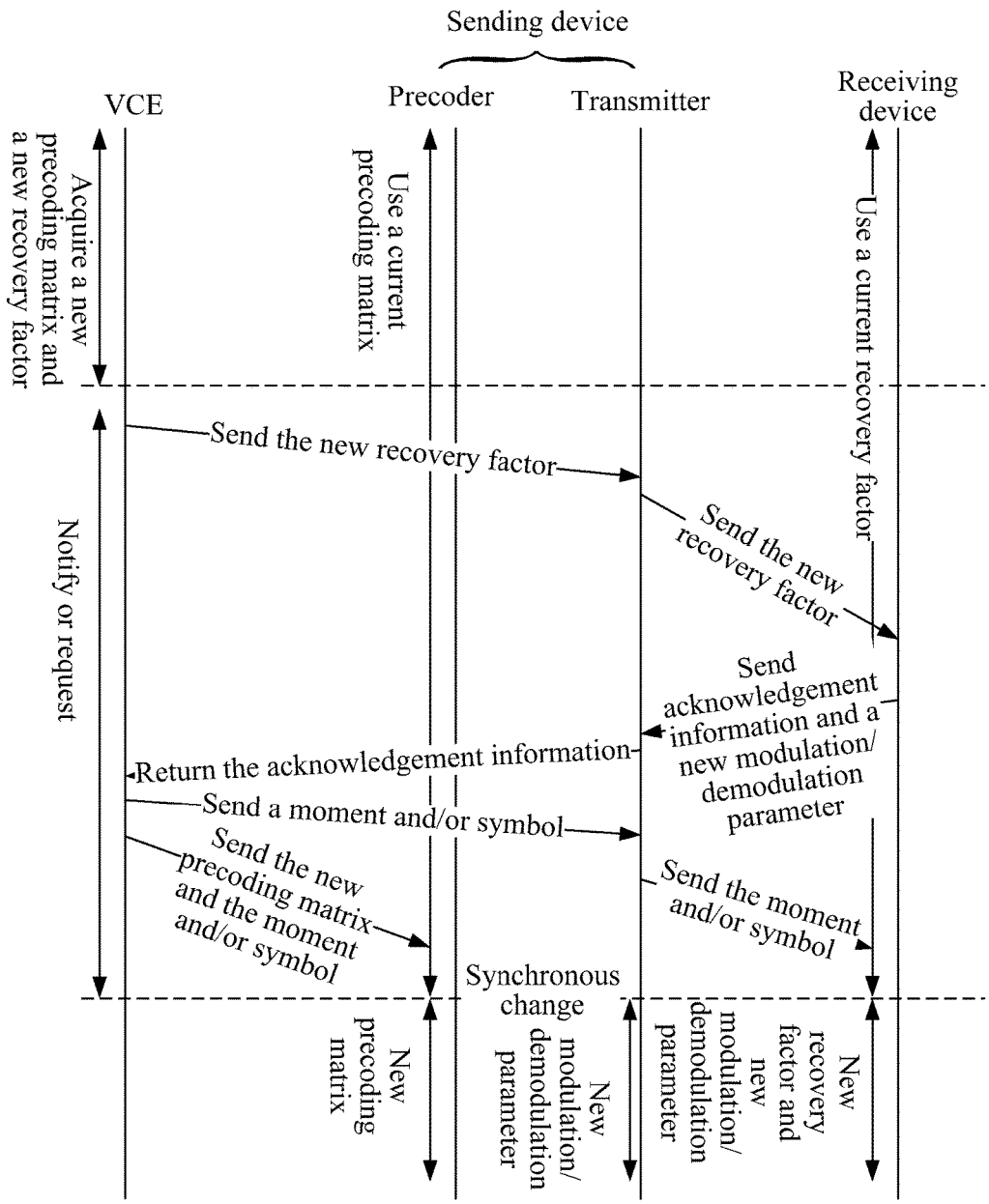
FIG. 8 is an interaction diagram of still another implementation manner of a method for adjusting parameters of a sending device and a receiving device of a line according to the present invention.

In addition, in still another implementation manner of a method for adjusting parameters of a sending device and a receiving device of a line according to the present invention, referring to FIG. 8, a transmitter does not calculate a new modulation/demodulation parameter, but a receiving device calculates the modulation/demodulation parameter. A VCE sends a new recovery factor $r_{kk}$ to the transmitter, so that the transmitter sends the new recovery factor $r_{kk}$ to the receiving device; the receiving device calculates the new modulation/demodulation parameter according to the new recovery factor $r_{kk}$ after receiving the new recovery factor $r_{kk}$, and sends acknowledgment information and the new modulation/demodulation parameter to the transmitter, so as to acknowledge, to the transmitter, that the receiving device has correctly received the new recovery factor $r_{kk}$ that needs to be used. After receiving the acknowledgment information sent by the receiving device, the transmitter sends acknowledgment information to the VCE, so as to acknowledge, to the VCE, that the receiving device corresponding to the transmitter has correctly received the new recovery factor $r_{kk}$ that needs to be used. The VCE receives the acknowledgment information that is sent by the transmitter and indicates that the receiving device corresponding to the transmitter has received the new recovery factor $r_{kk}$.

Figure 9:
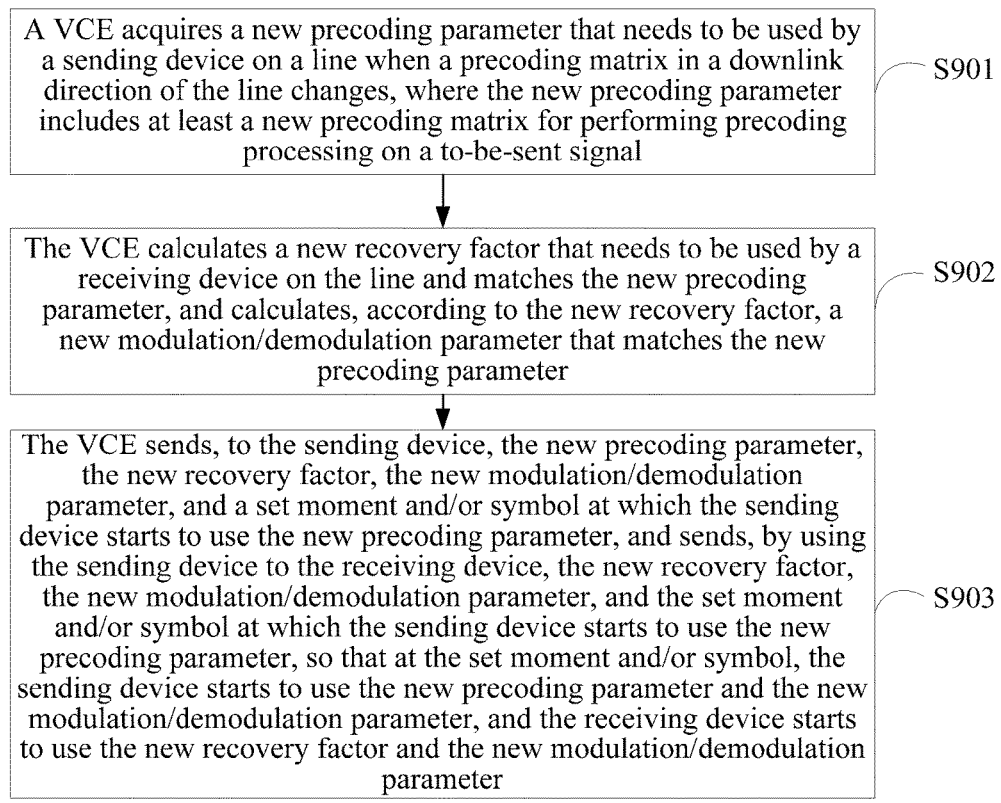
FIG. 9 is a flowchart of still another implementation manner of a method for adjusting parameters of a sending device and a receiving device of a line according to the present invention.
Figure 10:
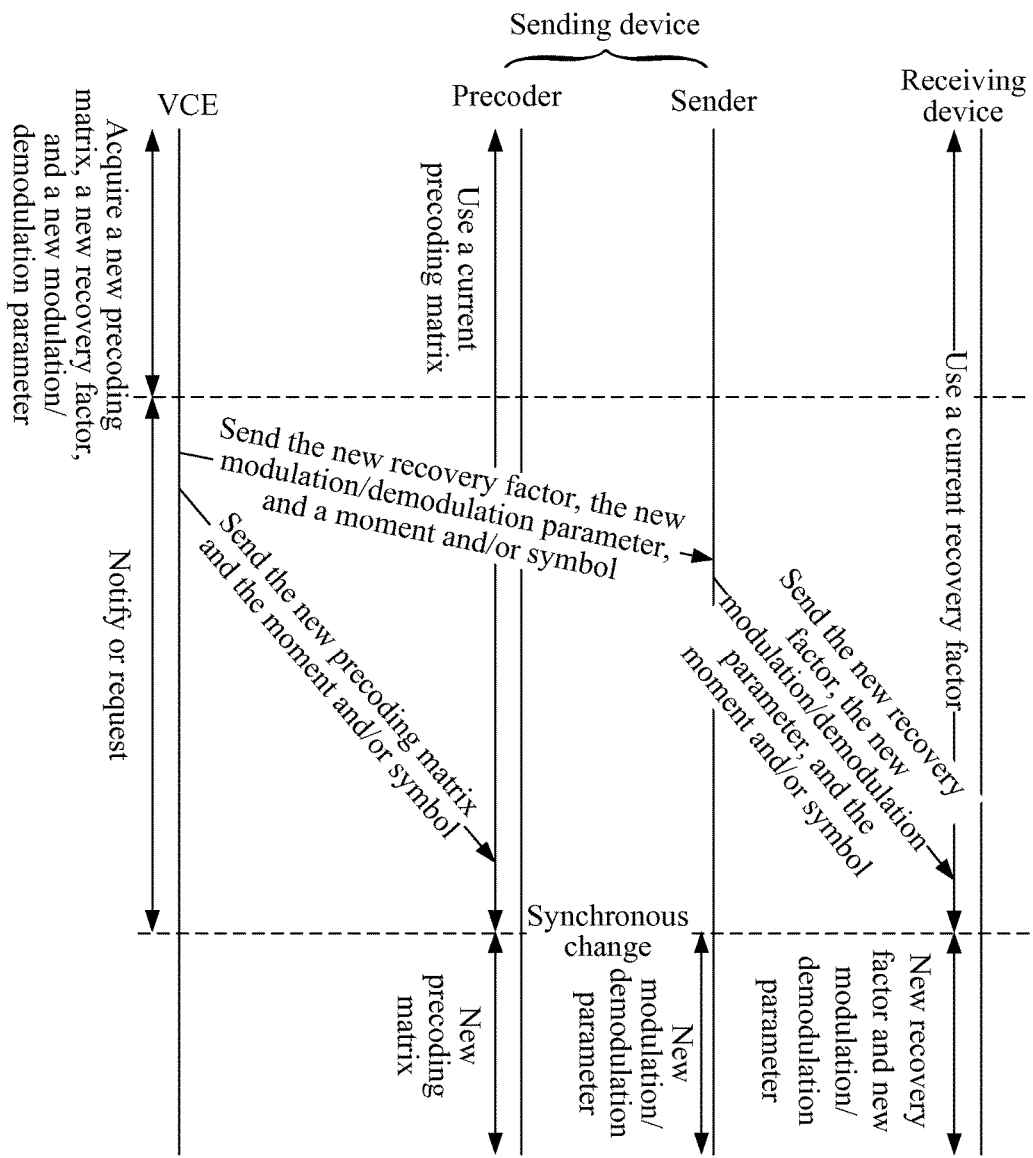
FIG. 10 is an interaction diagram of still another implementation manner of a method for adjusting parameters of a sending device and a receiving device of a line according to the present invention.

In addition, in still another implementation manner of a method for adjusting parameters of a sending device and a receiving device of a line according to the present invention, referring to FIG. 9 and with reference to FIG. 10, a transmitter does not calculate a new modulation/demodulation parameter, but a VCE calculates the modulation/demodulation parameter. The method for adjusting parameters of a sending device and a receiving device of a line in this implementation manner includes the following steps:

Step S901: A VCE acquires a new precoding parameter that needs to be used by a sending device on a line when a precoding matrix in a downlink direction of the line changes, where the new precoding parameter includes at least a new precoding matrix for performing precoding processing on a to-be-sent signal.

Step S902: The VCE calculates a new recovery factor that needs to be used by a receiving device on the line and matches the new precoding parameter, and calculates, according to the new recovery factor, a new modulation/demodulation parameter that matches the new precoding parameter.

In this implementation manner, the new recovery factor that needs to be used by the receiving device is a new signal recovery parameter that needs to be used by the receiving device and matches the new precoding parameter. After acquiring the new recovery factor by means of calculation, the VCE calculates, according to the new recovery factor, the new modulation/demodulation parameter that needs to be used by the line corresponding to a transmitter, where the modulation/demodulation parameter includes one or a combination of multiple of the following parameters:

(1) a bit table (bit table);
(2) a power gain table (gi table);
(3) a frequency domain equalization table (FEQ table, Frequency Domain Equalization table); and
(4) a physical media specific (PMS, Physical Media Specific)-layer framing parameter.

Step S903: The VCE sends, to the sending device, the new precoding parameter, the new recovery factor, the new modulation/demodulation parameter, and a set moment and/or symbol at which the sending device starts to use the new precoding parameter, and sends, by using the sending device to the receiving device, the new recovery factor, the new modulation/demodulation parameter, and the set moment and/or symbol at which the sending device starts to use the new precoding parameter, so that at the set moment and/or symbol, the sending device starts to use the new precoding parameter and the new modulation/demodulation parameter, and the receiving device starts to use the new recovery factor and the new modulation/demodulation parameter.

Specifically, the VCE sends, to a precoder in the sending device, the new precoding parameter and a set moment and/or symbol at which the precoder starts to use the new precoding parameter, and sends the new recovery factor, the new modulation/demodulation parameter, and the set moment and/or symbol to a transmitter in the sending device, so that the transmitter sends the new recovery factor, the new modulation/demodulation parameter, and the set moment and/or symbol to the receiving device; in this way, at the set moment and/or symbol, the precoder starts to use the new precoding parameter, the receiving device starts to use the new recovery factor, and simultaneously, the transmitter and the receiving device start to use the new modulation/demodulation parameter that matches the new precoding parameter.

In the foregoing implementation manner, sending of the new modulation/demodulation parameter, the new recovery factor $r_{kk}$, and the set moment and/or symbol to the receiving device by the transmitter or sending of the new modulation/demodulation parameter to the transmitter by the receiving device may be implemented in an OLR (Online Reconfiguration, online reconfiguration) manner. That is, the transmitter sends the new modulation/demodulation parameter, the new recovery factor $r_{kk}$, and the set moment and/or symbol to the receiving device by using one or more OLR messages, or the receiving device sends the new modulation/demodulation parameter to the transmitter by using one or more OLR messages.

In the foregoing implementation manners, a sending device performs precoding processing on a to-be-sent signal in a non-linear precoding manner, where a new precoding parameter that needs to be used by the sending device is a new precoding matrix; and a new parameter that needs to be used by a receiving device and matches the new precoding matrix is a new recovery factor, and in addition, a modulation/demodulation parameter that needs to be used by both the sending device and the receiving device and matches the new precoding matrix is further included. Synchronous coordination is implemented between related parameters of a sending device and a receiving device by means of unified control of a VCE, so that when the sending device uses a new precoding matrix and a new modulation/demodulation parameter, the receiving device also synchronously uses a new recovery factor and the new modulation/demodulation parameter that match the new precoding matrix, thereby implementing synchronous adjustment of the parameters of the sending device and the receiving device of the line.

Figure 11:
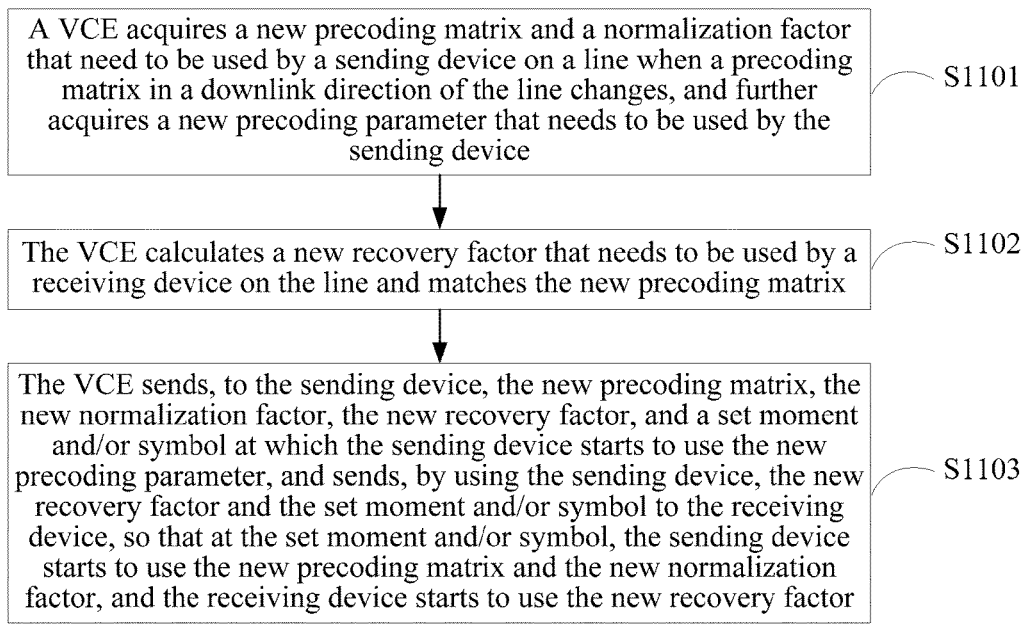
FIG. 11 is a flowchart of still another implementation manner of a method for adjusting parameters of a sending device and a receiving device of a line according to the present invention.

When a sending device performs precoding processing on a to-be-sent signal in a linear precoding manner, a precoding parameter that needs to be used by the sending device further includes, in addition to a precoding matrix, a normalization factor used for power limitation. Referring to FIG. 11, still another implementation manner of a method for adjusting parameters of a sending device and a receiving device of a line according to the present invention includes the following steps:

Step S1101: A VCE acquires a new precoding matrix and a normalization factor that need to be used by a sending device on a line when a precoding matrix in a downlink direction of the line changes, and further acquires a new precoding parameter that needs to be used by the sending device.

During crosstalk cancellation by means of linear precoding, to meet a limitation requirement of PSD, a precoder of the sending device performs linear precoding processing on a to-be-sent signal, and then amplifies or diminishes, in a normalized manner by using the normalization factor, the signal on which linear precoding processing has been performed; and then, a transmitter of the sending device sends the signal that is amplified or diminished in a normalized manner to a receiving device of a subscriber end.

By using n pairs of lines as an example, when lines #m+1, #m+2, . . . , and #n are in a non-activated state, a crosstalk channel matrix between m pairs of current Showtime-state lines is still as follows:

$$\tilde{H} = \begin{bmatrix} h_{1,1} & \cdots & h_{1,m} \\ \vdots & \ddots & \vdots \\ h_{m,1} & \cdots & h_{m,m} \end{bmatrix}_{m \times m}$$

A process in which the precoder currently performs linear precoding processing on the to-be-sent signal is expressed as follows: $\tilde{t}=\tilde{\lambda}\tilde{P}x$, where a normalization factor $\tilde{\lambda}$ and a precoding matrix $\tilde{P}$ are precoding parameters that are currently used by the precoder. The receiving device of the subscriber end correspondingly uses a recovery factor $1/\tilde{\lambda}$ to recover a received signal, so that a finally received signal is as follows:

$$\tilde{y} = \frac{1}{\tilde{\lambda}} \tilde{F}(\tilde{H}\tilde{\lambda}\tilde{P}x + \tilde{n})$$

Figure 12:
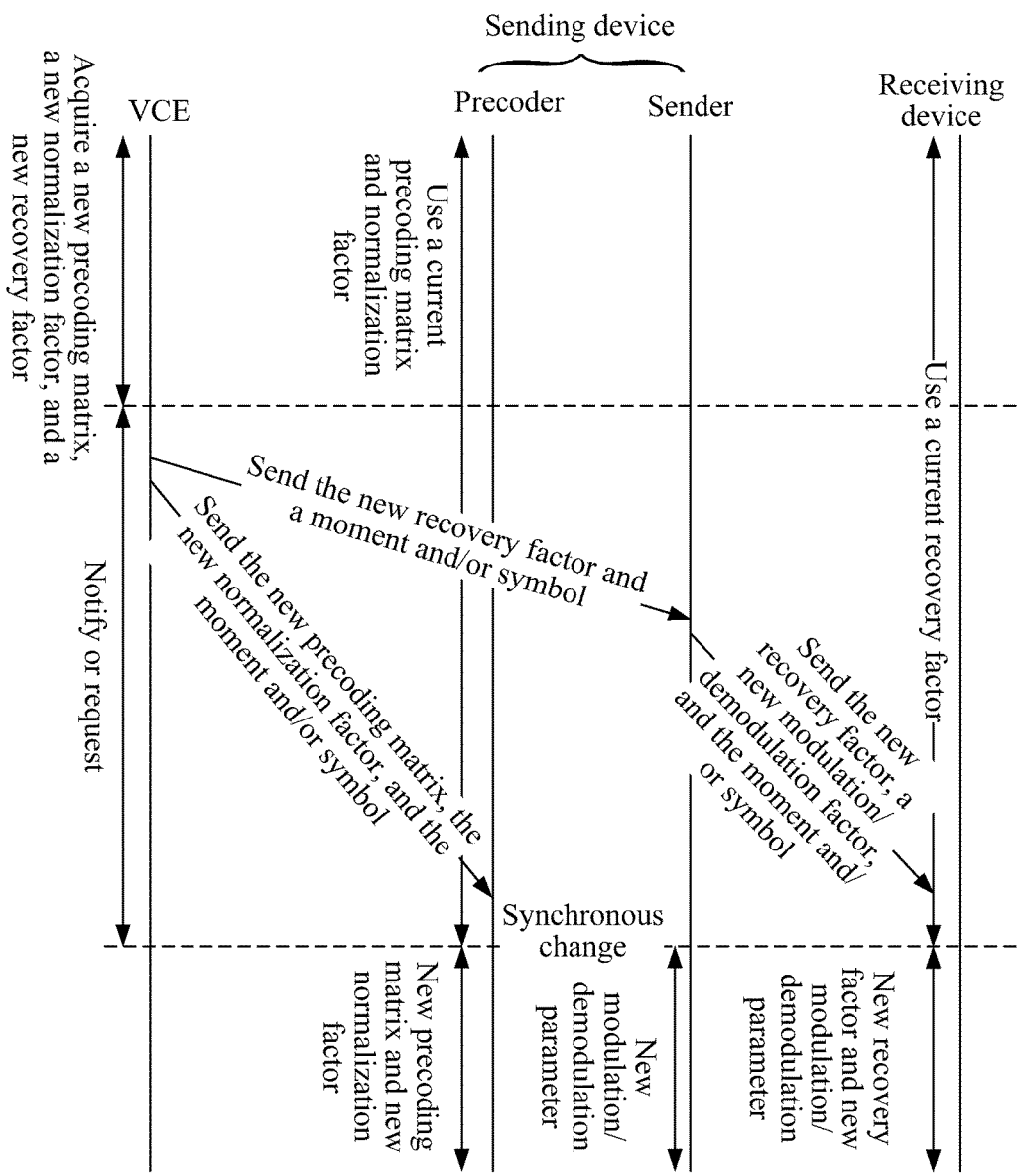
FIG. 12 is an interaction diagram of still another implementation manner of a method for adjusting parameters of a sending device and a receiving device of a line according to the present invention.

Further referring to FIG. 12, when a new line is activated or an existing line exits, a crosstalk channel matrix between all the lines changes from $\tilde{H}$ to H; for the Showtime-state line, it is required to change a precoding matrix $\tilde{P}$ that is currently used by the precoder. In this case, the VCE acquires, by means of measurement, estimation, or calculation, a new precoding matrix P that needs to be used by the precoder of the line; and then, a new normalization factor $\lambda$ that needs to be used by the precoder is calculated based on a PSD requirement and according to the new precoding matrix P, so as to obtain a new precoding parameter that needs to be used by the precoder. A process in which the precoder performs linear precoding processing on the to-be-sent signal changes from $\tilde{t}=\tilde{\lambda}\tilde{P}x$ to $t=\lambda Px$.

Step S1102: The VCE calculates a new recovery factor that needs to be used by a receiving device on the line and matches the new precoding matrix.

The VCE acquires, according to the new normalization factor $\lambda$, the new recovery factor $1/\lambda$ that needs to be used by the receiving device of the line. In this implementation manner, the new normalization factor $\lambda$ is reciprocal to the recovery factor $1/\lambda$.

Step S1103: The VCE sends, to the sending device, the new precoding matrix, the new normalization factor, the new recovery factor, and a set moment and/or symbol at which the sending device starts to use the new precoding parameter, and sends, by using the sending device, the new recovery factor and the set moment and/or symbol to the receiving device, so that at the set moment and/or symbol, the sending device starts to use the new precoding matrix and the new normalization factor, and the receiving device starts to use the new recovery factor.

Specifically, the VCE sends the new precoding matrix P, the new normalization factor $\lambda$, and the set moment and/or symbol to the precoder in the sending device, and sends the new recovery factor $1/\lambda$ and the set moment and/or symbol to the transmitter in the sending device; after receiving the new recovery factor $1/\lambda$, the transmitter calculates, according to the new recovery factor $1/\lambda$, a new modulation/demodulation parameter of a line corresponding to the transmitter, where the modulation/demodulation parameter includes one or a combination of multiple of the following parameters:

(1) a bit table (bit table);
(2) a power gain table (gi table);
(3) a frequency domain equalization table (FEQ table, Frequency Domain Equalization table); and
(4) a physical media specific (PMS, Physical Media Specific)-layer framing parameter.

When a new line is activated or an existing line exits, the Showtime-state line is probably interfered with by a sudden noise or another unstable noise; in this case, it is required to change the precoding matrix $\tilde{P}$ that is currently used by the precoder, so as to correctly perform crosstalk cancellation between lines. Correspondingly, the currently used normalization factor $\tilde{\lambda}$ should also change as the precoding matrix $\tilde{P}$ changes. When the normalization factor changes from $\tilde{\lambda}$ to $\lambda$, an SNR (signal-to-noise ratio) of the line also correspondingly changes from current $$\tilde{SNR}_k = \tilde{\lambda} \cdot \frac{\text{Signal\_PSD}_k}{\text{Noise\_PSD}_k}$$

to $$SNR_k = \lambda \cdot \frac{\text{Signal\_PSD}_k}{\text{Noise\_PSD}_k}$$

Then, the following equation is obtained:

$$SNR_k = \frac{\lambda}{\tilde{\lambda}} \cdot \tilde{SNR}_k$$

where $\text{Signal\_PSD}_k$ and $\text{Noise\_PSD}_k$ are respectively PSD of a sent signal and PSD of a background noise of a line #k. When $SNR_k$ goes beyond a certain range because the normalization factor changes from $\tilde{\lambda}$ to $\lambda$, the modulation/demodulation parameter of the line also needs to correspondingly change. In this case, the transmitter calculates a new modulation/demodulation parameter that needs to be used. The transmitter further sends, to the receiving device, the new modulation/demodulation parameter in addition to the new recovery factor $1/\lambda$ and the set moment and/or symbol, so that at the set moment and/or symbol, the precoder starts to use the new precoding matrix P and the new normalization factor $\lambda$, and the receiving device starts to use the new recovery factor $1/\lambda$; and in this case, a signal received by the receiving device changes from:

$$\tilde{y} = \frac{1}{\tilde{\lambda}}\tilde{F}(\tilde{H}\tilde{\lambda}\tilde{P}x + \tilde{n})$$

to:

$$y = \frac{1}{\lambda}F(H\lambda Px + n)$$

Simultaneously, the transmitter and the receiving device use the new modulation/demodulation parameter that matches the new precoding matrix, so that the modulation/demodulation parameter used by the transmitter and the receiving device can also be synchronously coordinated.

For example, at the set moment and/or symbol, the transmitter amplifies, by 1 time, the to-be-sent signal by using a new power gain table, and the receiving device diminishes, by a same multiple, the received signal also by using a corresponding new power gain table. For another example, the transmitter modifies, by using a new bit table, a current constellation diagram that is used for modulating a bit data and includes $2^a$ points into a constellation diagram that is used for modulating b bit data and includes $2^b$ points; and the receiving device modifies, also by using a corresponding new bit table, a current constellation diagram that is used for modulating a bit data and includes $2^a$ points into a constellation diagram that is used for modulating b bit data and includes $2^b$ points. In this way, parameters of the transmitter and the receiving device are synchronously adjusted, and a bit error rate of a signal that is caused by the receiving device is reduced.

In addition, the VCE may further send, to the transmitter, the new normalization factor $\lambda$ in addition to the new recovery factor $1/\lambda$, so that the transmitter can calculate the new modulation/demodulation parameter according to the new recovery factor $1/\lambda$ and/or the new normalization factor.

After the VCE acquires the new recovery factor $1/\lambda$ that needs to be used by the receiving device, the VCE sends the new precoding matrix P, the new normalization factor $\lambda$, and a set moment and/or symbol to the precoder in the sending device, where the set moment and/or symbol is a moment and/or symbol at which the precoder starts to use the new precoding matrix P and the new normalization factor $\lambda$. In addition, the VCE further sends the new recovery factor $1/\lambda$ and the set moment and/or symbol to the transmitter; and after receiving the new recovery factor $1/\lambda$ and the set moment and/or symbol, the transmitter calculates the new modulation/demodulation parameter according to the new recovery factor $1/\lambda$, and then sends the new modulation/demodulation parameter, the new recovery factor $1/\lambda$, and the set moment and/or symbol to the receiving device, so that at the moment and/or symbol, the precoder starts to use the new precoding matrix P and the new normalization factor $\lambda$, and the receiving device also synchronously starts to use the new recovery factor $1/\lambda$, thereby implementing synchronous coordination between parameters of the precoder and the receiving device.

In this implementation manner, processes in which the sending device precodes the signal and amplifies or diminishes the precoded signal in a normalized manner are both performed in the precoder, and the VCE sends, to the precoder, the new precoding matrix P and the new normalization factor $\lambda$ that are to be used by the precoder. In still another implementation manner of a method for adjusting parameters of a sending device and a receiving device of a line according to the present invention, referring to FIG. 13, processes of precoding a signal and amplifying or diminishing the precoded signal in a normalized manner may be respectively performed in a precoder and a transmitter. In this case, a step that a VCE sends, to a sending device, a new precoding parameter, a new recovery factor, and a set moment and/or symbol at which the sending device starts to use the new precoding parameter includes that: the VCE sends, to a precoder in the sending device, a new precoding matrix and a set moment and/or symbol at which the precoder starts to use the new precoding matrix, and at the same time, sends a new normalization factor, the new recovery factor, and the set moment and/or symbol to a transmitter in the sending device, so that the transmitter sends the new recovery factor and the set moment and/or symbol to a receiving device; and in this way, at the set moment and/or symbol, the precoder starts to use the new precoding matrix, the transmitter starts to use the new normalization factor, and the receiving device starts to use the new recovery factor. In this implementation manner, it is required to synchronously coordinate related parameters that are used by the precoder, the transmitter, and the receiving device. The VCE sends, to the precoder and the transmitter, the new precoding matrix, and the new normalization factor and/or the new recovery factor that need to be used by the precoder and the transmitter respectively, and further sends a set moment and/or symbol; after receiving the new normalization factor $\lambda$ and/or the new recovery factor, and the set moment and/or symbol, the transmitter calculates a new modulation/demodulation parameter according to the new normalization factor and/or the new recovery factor, and then sends the new modulation/demodulation parameter, the new recovery factor, and the set moment and/or symbol to the receiving device. Finally, at the set moment and/or symbol, the precoder starts to use the new precoding matrix, the transmitter starts to use the new normalization factor, and the receiving device starts to use the new recovery factor; and at the same time, the sending device and the receiving device start to use the new modulation/demodulation parameter that matches the new precoding parameter.

Figure 13:
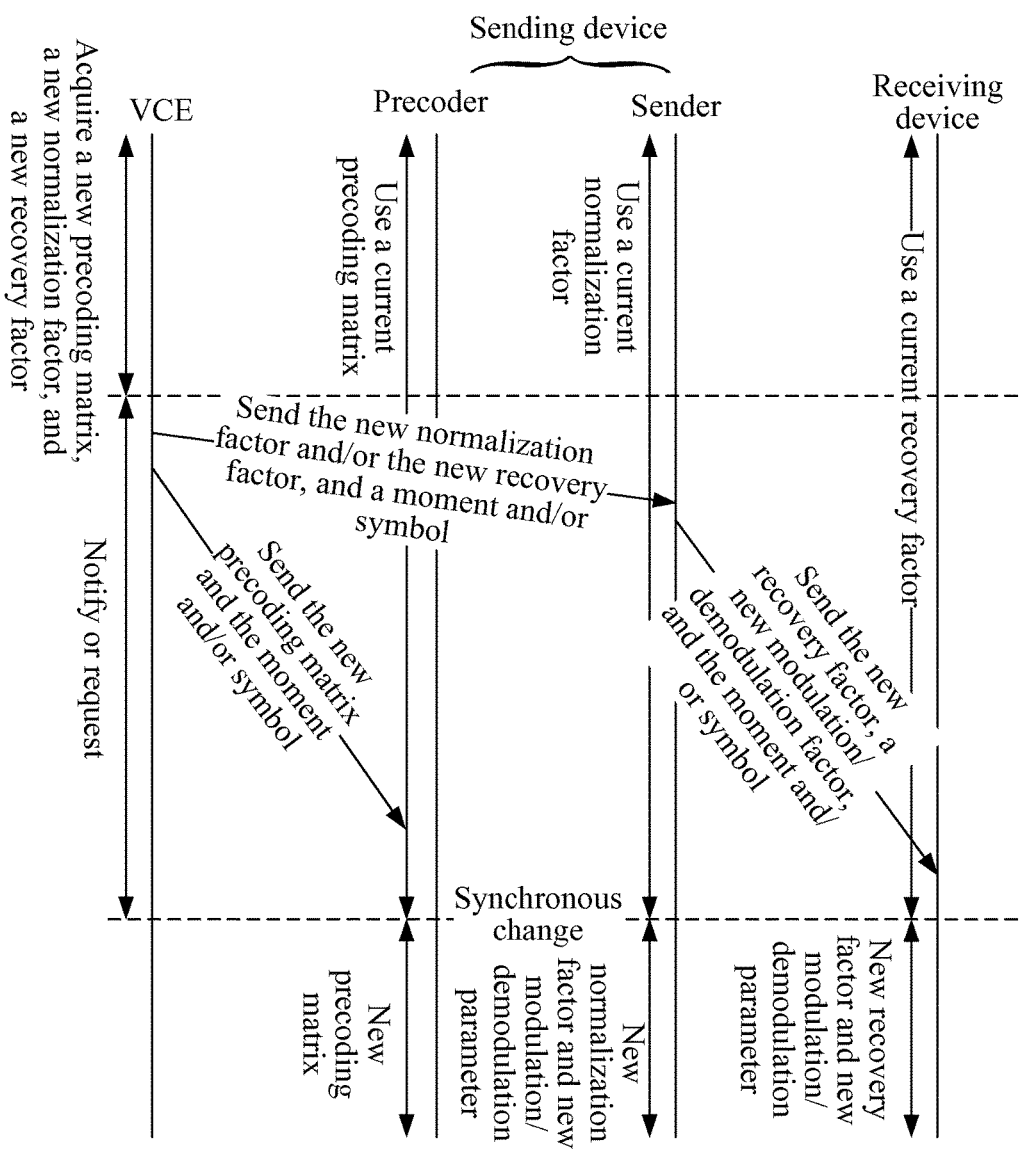
FIG. 13 is an interaction diagram of still another implementation manner of a method for adjusting parameters of a sending device and a receiving device of a line according to the present invention.

The implementation manners shown in FIG. 11 to FIG. 13 use a mechanism in which the receiving device does not need to give a feedback. In addition, a feedback mechanism may also be used. The VCE may successively send, to the receiving device by using the transmitter, related data that needs to be used by the receiving device; in addition, when the feedback mechanism is used, the new modulation/demodulation parameter may be calculated according to the new recovery factor by the receiving device and then sent to the transmitter, where a specific process may be performed with reference to the implementation manners shown in FIG. 7 and FIG. 8, and details are not described herein. In addition, during crosstalk cancellation by means of linear precoding, a normalization factor and a recovery factor of each line may be calculated by using an optimized method, and normalization factors of lines may be different; and reference may be made to the foregoing implementation manners for a specific process, and details are not described herein.

It should be noted that, in another implementation manner, when $SNR_k$ changes, it is probably not required to change any one of parameters: a bit table, a power gain table, a frequency domain equalization table, and a framing parameter that are currently used by the transmitter; and in this case, the transmitter or the receiving device does not need to notify the other party of a new parameter.

In addition, in the foregoing implementation manners, a new signal recovery parameter that needs to be used by the receiving device is a new recovery factor; and in another implementation manner, the new signal recovery parameter may also be a variation of a recovery factor that is currently used by the receiving device. After receiving the variation, the receiving device enables the currently used recovery factor to change according to the variation, so as to obtain a new recovery factor. For example, when the variation is the double of the currently used recovery factor, the receiving device enables, after receiving the variation, the currently used recovery factor to increase by two times, to obtain a new recovery factor, so that the new recovery factor starts to be used at a set moment and/or symbol.

To sum up, when a new line is activated or an existing line exits, for a Showtime-state line, it is required to change a precoding matrix that needs to be used by a sending device; and when the precoding matrix changes, a related parameter, such as a recovery factor, that needs to be used by a receiving device also needs to change; therefore, parameters of the sending device and the receiving device of the line need to be synchronously coordinated. In the foregoing implementation manners of the present invention, by means of unified control of a VCE, synchronous adjustment for the parameters of the sending device and the receiving device can be implemented, so that when the sending device uses a new precoding parameter (for example, a precoding matrix) to perform precoding processing on a to-be-sent signal, the receiving device also uses, at a same moment, a modulation parameter (for example, a recovery factor) that matches the new precoding parameter, to recover a received signal, thereby reducing a bit error rate or even a distortion rate of the received signal that is caused by the receiving device.

It should be noted that, in the foregoing implementation manners, a sending device and a receiving device of a Showtime-state line are jointly coordinated, and the method for adjusting parameters of a sending device and a receiving device of a line according to the present invention is also applicable to a newly added line (an initial line). In this case, a new precoding parameter that is required by a sending device of the initial line is a precoding matrix (a normalization factor is further required in a crosstalk cancellation manner by means of linear precoding), and a new modulation parameter that needs to be used by a receiving device is a recovery factor. After acquiring a new precoding matrix that is required by the sending device and a new recovery factor that needs to be used by the receiving device and matches the new precoding matrix, a VCE sends, to the sending device, the new precoding matrix and a set moment and/or symbol at which the new precoding matrix starts to be used, and a transmitter sends the new recovery factor and the set moment and/or symbol to the receiving device, so that at the set moment and/or symbol, the sending device starts to use the new precoding matrix to perform precoding processing on a to-be-sent signal, and the receiving device starts to use the new recovery factor to recover a received signal. It should be noted that, during line initialization, the transmitter sends related data (for example, a recovery factor, and a set moment and/or symbol) to the receiving device by means of message interaction during the initialization, for example, the transmitter sends the related data by using one or more SOC (Special Operations Channel, special operations channel) messages.

Figure 14:
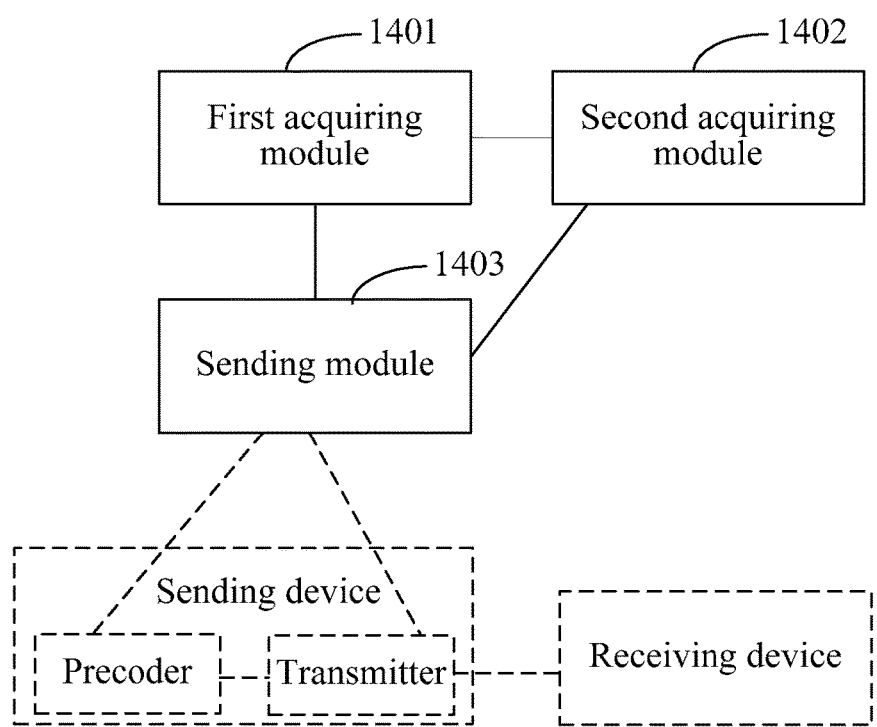
FIG. 14 is a schematic structural diagram of an implementation manner of a terminal device according to the present invention.

Referring to FIG. 14, in a schematic structural diagram of an implementation manner of a terminal device according to the present invention, the terminal device includes a first acquiring module 1401, a second acquiring module 1402, and a sending module 1403.

The first acquiring module 1401 is configured to acquire a new precoding parameter that needs to be used by a sending device on a line when a precoding matrix in a downlink direction of the line changes, where the new precoding parameter includes at least a new precoding matrix for performing precoding processing on a to-be-sent signal. In this implementation manner, the sending device performs precoding processing on a signal in a non-linear precoding manner. When a new line is activated or an existing line exits, new crosstalk interference is caused to a Showtime-state line, and it is required to change a precoding matrix that is currently used by the Showtime-state line. In this case, the new precoding parameter acquired by the first acquiring module 1401 is a new precoding matrix that needs to be used by a precoder in the sending device. The second acquiring module 1402 is configured to acquire a new recovery factor that needs to be used by a receiving device of the line and matches the new precoding parameter. After the first acquiring module 1401 acquires the new precoding matrix, the second acquiring module 1402 calculates, according to the new precoding matrix, the new recovery factor that needs to be used by the receiving device. The sending module 1403 is configured to send, to the sending device, the new precoding parameter, the new recovery factor, and a set moment and/or symbol at which the sending device starts to use the new precoding parameter, and send, by using the sending device, the new recovery factor and the set moment and/or symbol to the receiving device. Specifically, the sending module 1403 sends, to the precoder in the sending device, the new precoding matrix that needs to be used by the precoder and the set moment and/or symbol at which the precoder starts to use the new precoding matrix, and sends the new recovery factor and the set moment and/or symbol to a transmitter in the sending device. After receiving the new recovery factor, the transmitter calculates, according to the new recovery factor, a new modulation/demodulation parameter of a line corresponding to the transmitter, where the modulation/demodulation parameter includes one or a combination of multiple of the following parameters:

(1) a bit table (bit table);
(2) a power gain table (gi table);
(3) a frequency domain equalization table (FEQ table, Frequency Domain Equalization table); and
(4) a physical media specific (PMS, Physical Media Specific)-layer framing parameter.

In addition, after calculating the new modulation/demodulation parameter, the transmitter sends the new recovery factor, the new modulation/demodulation parameter, and the set moment and/or symbol to the receiving device, so that at the set moment and/or symbol, the precoder in the sending device starts to use the new precoding matrix, the receiving device starts to use the new recovery factor $r_{kk}$, and simultaneously the transmitter in the sending device and the receiving device start to use the new modulation/demodulation parameter that matches the new precoding parameter.

In the foregoing manner, when a precoder in a sending device uses a new precoding matrix to perform precoding processing on a to-be-sent signal, a receiving device also uses, at a same moment, a new recovery factor that matches the new precoding matrix, to recover a received signal; in addition, a transmitter and the receiving device also use, at the same moment, a new modulation/demodulation parameter, thereby implementing joint adjustment for parameters of the precoder, the transmitter, and the receiving device, and reducing a bit error rate or even a distortion rate of the received signal that is caused by the receiving device.

Figure 15:
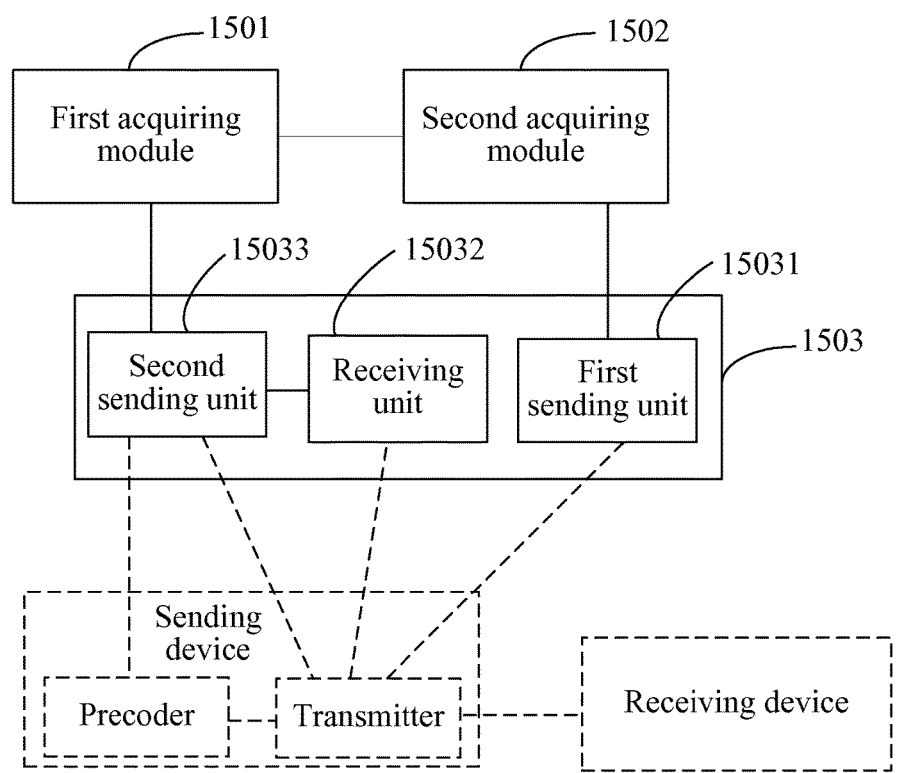
FIG. 15 is a schematic structural diagram of another implementation manner of a terminal device according to the present invention.

In addition, in this implementation manner, the sending module 1403 directly sends, to the receiving device without a need of a feedback, the new recovery factor, the new modulation/demodulation parameter, and the set moment and/or symbol that need to be used by the receiving device. In another implementation manner, referring to FIG. 15, a sending module 1503 and a transmitter jointly send, to a receiving device in a feedback manner, a new recovery factor, a new modulation/demodulation parameter, and a set moment and/or symbol that need to be used by the receiving device. In this implementation manner, referring to FIG. 15, the sending module 1503 includes a first sending unit 15031, a receiving unit 15032, and a second sending unit 15033.

The first sending unit 15031 is configured to send the new recovery factor to a transmitter in the sending device, so that the transmitter sends the new recovery factor to the receiving device. In addition, after receiving the new recovery factor sent by the first sending unit 15031, the transmitter calculates, according to the new recovery factor, a new modulation/demodulation parameter of a line corresponding to the transmitter, where the new modulation/demodulation parameter matches the new precoding parameter and/or the new recovery factor; and in this case, the transmitter further sends, to the receiving device, the new modulation/demodulation parameter in addition to the new recovery factor. The receiving unit 15032 is configured to receive acknowledgment information that is sent by the transmitter and indicates that the receiving device has correctly received the new recovery factor, where the new recovery factor needs to be used by the receiving device. After receiving the new modulation/demodulation parameter and the new recovery factor, the receiving device sends acknowledgment information to the transmitter, so as to acknowledge, to the transmitter, that the receiving device has correctly received the new recovery factor that needs to be used. After receiving the acknowledgment information sent by the receiving device, the transmitter sends acknowledgment information to the receiving unit 15032, so as to acknowledge, to the receiving unit 15032, that the receiving device corresponding to the transmitter has correctly received the new recovery factor that needs to be used. The receiving unit 15032 receives the acknowledgment information that is sent by the transmitter and indicates that the receiving device corresponding to the transmitter has received the new recovery factor. The second sending unit 15033 sends the new precoding parameter and a set moment and/or symbol to a precoder in the sending device according to the acknowledgment information, and sends the set moment and/or symbol to the transmitter, so that the transmitter sends the set moment and/or symbol to the receiving device. After receiving the set moment and/or symbol, the transmitter sends the set moment and/or symbol to the receiving device. The set moment and/or symbol is a moment and/or symbol at which the sending device starts to use the new precoding parameter, so as to instruct the receiving device to use the new recovery factor at the moment and/or symbol. Simultaneously, at the moment and/or symbol, the transmitter and the receiving device start to use the new modulation/demodulation parameter that matches the new precoding parameter and/or the new recovery factor.

In the foregoing implementation manner, after receiving the new recovery factor, the transmitter calculates the new modulation/demodulation parameter according to the new recovery factor; and in another implementation manner, the transmitter does not calculate the new modulation/demodulation parameter, but the receiving device calculates the modulation/demodulation parameter. In this case, the transmitter sends the new recovery factor to the receiving device; and after receiving the new recovery factor, the receiving device calculates the new modulation/demodulation parameter according to the new recovery factor, and sends acknowledgment information and the new modulation/demodulation parameter to the transmitter, so as to acknowledge, to the transmitter, that the receiving device has correctly received the new recovery factor that needs to be used. After receiving the acknowledgment information sent by the receiving device, the transmitter sends acknowledgment information to the receiving unit, so as to acknowledge, to the receiving unit, that the receiving device corresponding to the transmitter has correctly received the new recovery factor that needs to be used. The receiving unit receives the acknowledgment information that is sent by the transmitter and indicates that the receiving device corresponding to the transmitter has received the new recovery factor.

Figure 16:
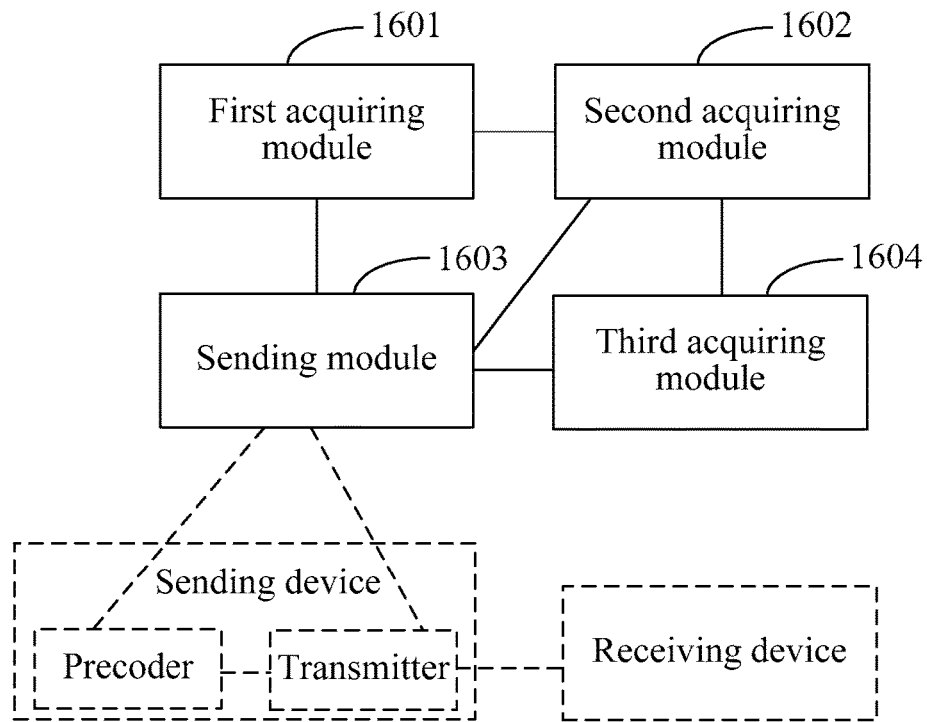
FIG. 16 is a schematic structural diagram of still another implementation manner of a terminal device according to the present invention.

In still another implementation manner of a terminal device, referring to FIG. 16, the terminal device further includes a third acquiring module 1604. The third acquiring module 1604 is configured to calculate, according to a new recovery factor acquired by a second acquiring module 1602, a new modulation/demodulation parameter that matches a new precoding parameter. The modulation/demodulation parameter includes one or a combination of multiple of the following parameters:

(1) a bit table (bit table);
(2) a power gain table (gi table);
(3) a frequency domain equalization table (FEQ table, Frequency Domain Equalization table); and
(4) a physical media specific (PMS, Physical Media Specific)-layer framing parameter.

In this case, a sending module 1603 further sends, to the sending device, the new modulation/demodulation parameter in addition to the new precoding parameter, the new recovery factor, and a set moment and/or symbol.

In the foregoing implementation manners, a sending device performs precoding processing on a to-be-sent signal in a non-linear precoding manner, and a required precoding parameter is a precoding matrix. However, during crosstalk cancellation by means of linear precoding, a precoding parameter used by the sending device further includes, in addition to a precoding matrix, a normalization factor used for power limitation. When a new line is activated or an existing line exits, a first acquiring module acquires a new precoding matrix that needs to be used by a sending device of a Showtime-state line, and then acquires a new normalization factor according to the new precoding matrix. In this case, a sending module sends, to a precoder, the new precoding matrix, the new normalization factor, and a set moment and/or symbol at which the precoder starts to use the new precoding matrix and the new normalization factor, and sends a new recovery factor and the set moment and/or symbol to a transmitter, so that the transmitter sends the new recovery factor and the set moment and/or symbol to a receiving device; and in this way, at the set moment and/or symbol, the precoder starts to use the new precoding matrix to perform precoding processing on a to-be-sent signal and starts to use the new normalization factor to amplify or diminish, in a normalized manner, the signal on which precoding processing has been performed, and the receiving device starts to use the new recovery factor, thereby implementing synchronous coordination between parameters of the precoder, the transmitter, and the receiving device, and reducing a bit error rate of a signal that is caused by the receiving device.

In another implementation manner, the sending module may send the new precoding matrix to the precoder, and send the new normalization factor to the transmitter, so that at the set moment and/or symbol, the precoder starts to use the new precoding matrix to perform precoding processing on a to-be-sent signal and the transmitter starts to use the new normalization factor to amplify or diminish, in a normalized manner, the signal on which precoding processing has been performed, thereby implementing synchronous coordination between the precoder and the transmitter; and in this way, the parameters of the precoder, the transmitter, and the receiving device can be synchronously adjusted.

To sum up, by using the terminal device in the present invention, synchronous adjustment for parameters of a sending device and a receiving device of a line can be implemented, and a bit error rate of a signal that is caused by the receiving device is reduced.

Figure 17:
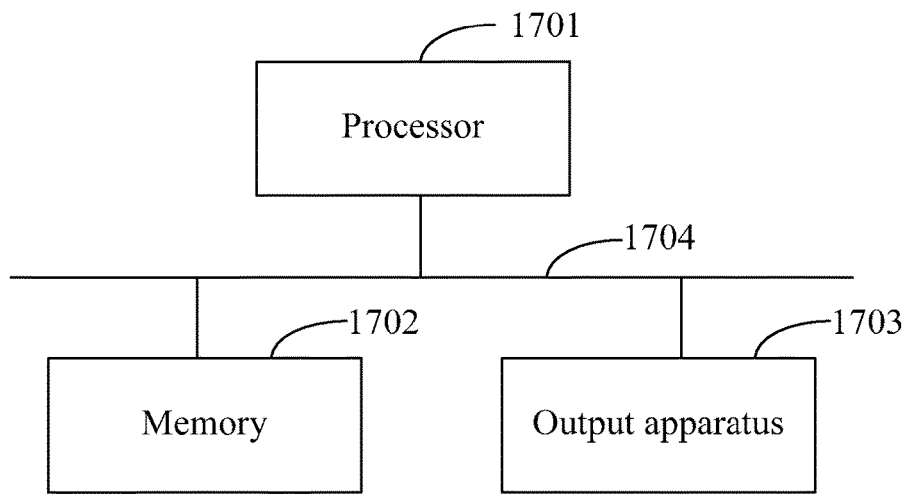
FIG. 17 is a schematic structural diagram of still another implementation manner of a terminal device according to the present invention.

Referring to FIG. 17, in another implementation manner of a terminal device according to the present invention, the terminal device includes a processor 1701, a memory 1702, and an output apparatus 1703, where the processor 1701, the memory 1702, and the output apparatus 1703 communicate with each other by using a bus 1704.

The memory 1702 is configured to store data of the terminal device.

The processor 1701 is configured to acquire a new precoding parameter that needs to be used by a sending device on a line when a precoding matrix in a downlink direction of the line changes, where the new precoding parameter includes at least a new precoding matrix for performing precoding processing on a to-be-sent signal.

The processor 1701 is further configured to acquire a new recovery factor that needs to be used by a receiving device on the line and matches the new precoding parameter.

The output apparatus 1703 is configured to send, to the sending device, the new precoding parameter and the new recovery factor that are acquired by the processor 1701, and a set moment and/or symbol at which the sending device starts to use the new precoding parameter, and send, by using the sending device, the new recovery factor and the set moment and/or symbol to the receiving device, so that at the set moment and/or symbol, the sending device starts to use the new precoding parameter and the receiving device starts to use the new recovery factor that matches the precoding parameter.

By using the terminal device in this implementation manner, a sending device and a receiving device can synchronously change new parameters at a same moment and/or symbol, thereby implementing joint coordination between parameters of the sending device and the receiving device, and reducing a bit error rate of a signal that is caused by the receiving device.

The foregoing descriptions are merely intended for describing the technical solutions of the present invention, but are not for limiting the present invention. Although the present invention is described in detail with reference to the foregoing implementation manners, persons of ordinary skill in the art should understand that they may still make modifications to the technical solutions described in the foregoing implementation manners or make equivalent replacements to some technical features thereof; however, these modifications or replacements do not make the essence of corresponding technical solutions depart from the spirit and scope of the technical solutions in the implementation manners of the present invention.

What is claimed is:

1. A method for adjusting parameters of a sending device and a receiving device of a line, comprising:
    acquiring, by a vectoring control entity (VCE) terminal device, a new precoding parameter that needs to be used by the sending device on the line when a precoding matrix in a downlink direction of the line changes, wherein the new precoding parameter comprises at least a new precoding matrix for performing precoding processing on a signal to be sent though the line;
    acquiring a new signal recovery parameter that needs to be used by the receiving device on the line and matches the new precoding parameter; and
    sending, to the sending device, the new precoding parameter, the new signal recovery parameter, and at least one of a set moment and a set symbol indicating a time at which the sending device starts to use the new precoding parameter; and
    enabling the sending device to send the new signal recovery parameter and the at least one of the set moment and the set symbol to the receiving device, so that at the time indicated by the at least one of the set moment and the set symbol, the sending device starts to use the new precoding parameter and the receiving device starts to use the new signal recovery parameter that matches the new precoding parameter at the time.

2. The method according to claim 1, wherein sending the new precoding parameter, the new signal recovery parameter, and the at least one of the set moment and the symbol comprises:
    sending the new signal recovery parameter to a transmitter in the sending device, so that the transmitter sends the new signal recovery parameter to the receiving device;
    receiving acknowledgment information that is sent by the transmitter and indicates that the receiving device has correctly received the new signal recovery parameter, wherein the new signal recovery parameter needs to be used by the receiving device; and sending, to a precoder in the sending device according to the acknowledgment information, the new precoding parameter and the at least one of the set moment and the symbol at which the precoder starts to use the new precoding parameter, and sending the at least one of the set moment and the set symbol to the transmitter, so that the transmitter sends the at least one of the set moment and the set symbol to the receiving device.

3. The method according to claim 1, wherein
after acquiring the new signal recovery parameter, the method comprises:
acquiring, according to the new signal recovery parameter one of a new modulation parameter and a new demodulation parameter that matches the new precoding parameter.

4. The method according to claim 3, wherein
sending the new precoding parameter, the new signal recovery parameter, and the at least one of the set moment and the set symbol comprises:
further sending, to the sending device one of the new modulation parameter and the new demodulation parameter in addition to the new precoding parameter, the new signal recovery parameter, and the at least one of the set moment and the set symbol at which the sending device starts to use the new precoding parameter.

5. The method according to claim 1, wherein
acquiring the new signal recovery parameter comprises:
acquiring a new recovery factor that needs to be used by the receiving device on the line and matches the new precoding parameter, to acquire the new signal recovery parameter.

6. The method according to claim 5, wherein
sending the new precoding parameter, the new signal recovery parameter, and the at least one of the set moment and the set symbol comprises:
(a) sending the new recovery factor to a transmitter in the sending device, so that the transmitter acquires, according to the new recovery factor one of a new modulation parameter and a new demodulation parameter that matches the new precoding parameter; or
(b) sending the new recovery factor to the transmitter in the sending device, so that the transmitter sends the new recovery factor to the receiving device, and then the receiving device acquires, according to the new recovery factor, the new modulation/demodulation parameter that matches the new precoding parameter.

7. The method according to claim 1, wherein
acquiring the new precoding parameter comprises:
further acquiring, in addition to the new precoding matrix, a new normalization factor that needs to be used by the sending device and is used for power limitation, to obtain the new precoding parameter.

8. The method according to claim 7, wherein
sending the new precoding parameter, the new signal recovery parameter, and the at least one of the set moment and the set symbol comprises:
sending the new normalization factor to a transmitter in the sending device, so that the transmitter acquires, according to the new normalization factor, one of a new modulation parameter and a new demodulation parameter that matches the new precoding parameter.

9. The method according to claim 7, wherein
sending the new precoding parameter, the new signal recovery parameter, and the at least one of the set moment and the set symbol comprises:
sending, to a precoder in the sending device, the new precoding matrix, the new normalization factor, and another at least one of a set moment and a set symbol indicating another time at which the precoder starts to use the new precoding matrix and the new normalization factor, and sending the new signal recovery parameter and the another at least one of the set moment and the set symbol to a transmitter in the sending device.

10. The method according to claim 7, wherein
sending the new precoding parameter, the new signal recovery parameter, and the at least one of the set moment and the set symbol comprises:
sending, to a precoder in the sending device, the new precoding matrix and the at least one of the set moment and the set symbol at which the precoder starts to use the new precoding matrix, and sending the new normalization factor, the new signal recovery parameter, and the at least one of the set moment and the set symbol to a transmitter in the sending device.

11. A terminal device, comprising a processor, a memory, and an output apparatus, wherein the memory and the output apparatus are both connected to the processor by a bus;
the memory is configured to store data of the terminal device;
the processor is configured to acquire a new precoding parameter that needs to be used by a sending device on a line when a precoding matrix in a downlink direction of the line changes, wherein the new precoding parameter comprises at least a new precoding matrix for performing precoding processing on a signal to be sent by the line;
the processor is further configured to acquire a new signal recovery parameter that needs to be used by a receiving device on the line and matches the new precoding parameter; and
the output apparatus is configured to send, to the sending device, the new precoding parameter, the new signal recovery parameter, and at least one of a set moment and a set symbol indicating a time at which the sending device starts to use the new precoding parameter, and enable the sending device to send the new signal recovery parameter and the at least one of the set moment and the set symbol to the receiving device, so that at the time indicated by the at least one of the set moment and the set symbol, the sending device starts to use the new precoding parameter and the receiving device starts to use the new signal recovery parameter that matches the new precoding parameter at the time.

12. The terminal device according to claim 11, wherein
the output apparatus is configured to send the new signal recovery parameter to a transmitter in the sending device, so that the transmitter sends the new signal recovery parameter to the receiving device;
receive acknowledgment information that is sent by the transmitter and indicates that the receiving device has correctly received the new signal recovery parameter, wherein the new signal recovery parameter needs to be used by the receiving device; and
send, to a precoder in the sending device according to the acknowledgment information, the new precoding parameter and the at least one of the set moment and the set symbol at which the precoder starts to use the new precoding parameter, and send the at least one of the set moment and the set symbol to the transmitter, so that the transmitter sends the at least one of the set moment and the set symbol to the receiving device.

13. The terminal device according to claim 11, wherein the processor is further configured to acquire, according to the new signal recovery parameter one of a new modulation parameter and a new demodulation parameter that matches the new precoding parameter.

14. The terminal device according to claim 11, wherein the output apparatus is configured to further send, to the sending device one of the new modulation parameter and the new demodulation parameter in addition to the new precoding parameter, the new signal recovery parameter, and the at least one of the set moment and the set symbol at which the sending device starts to use the new precoding parameter.

15. The terminal device according to claim 11, wherein the processor is further configured to acquire a new recovery factor that needs to be used by the receiving device on the line and matches the new precoding parameter acquired by the first acquiring module, to acquire the new signal recovery parameter.

16. The terminal device according to claim 15, wherein the output apparatus is configured to implement one of the following:
   (a) sending the new recovery factor to a transmitter in the sending device, so that the transmitter acquires, according to the new recovery factor one of a new modulation parameter and a new demodulation parameter that matches the new precoding parameter; and
   (b) sending the new recovery factor to a transmitter in the sending device, so that the transmitter sends the new recovery factor to the receiving device, and then the receiving device acquires, according to the new recovery factor one of the new modulation parameter and the new demodulation parameter that matches the new precoding parameter.

17. The terminal device according to claim 11, wherein the processor is configured to further acquire, in addition to the new precoding matrix, a new normalization factor that needs to be used by the sending device and is used for power limitation, to obtain the new precoding parameter.

18. The terminal device according to claim 17, wherein the output apparatus is configured to send the new normalization factor to a transmitter in the sending device, so that the transmitter acquires, according to the new normalization factor one of a new modulation parameter and a new demodulation parameter that matches the new precoding parameter.

19. The terminal device according to claim 17, wherein the output apparatus is further configured to send, to a precoder in the sending device, the new precoding matrix, the new normalization factor, and another at least one of the set moment and the set symbol indicating another time at which the precoder starts to use the new precoding matrix and the new normalization factor, and send the new signal recovery parameter and the another at least one of the set moment and the set symbol to a transmitter in the sending device.

20. The terminal device according to claim 17, wherein the output apparatus is further configured to send, to a precoder in the sending device, the new precoding matrix and the at least one of the set moment and the set symbol at which the precoder starts to use the new precoding matrix, and send the new normalization factor, the new signal recovery parameter, and the at least one of the set moment and the set symbol to a transmitter in the sending device.

\* \* \* \* \*